(12) United States Patent
Hakim

(10) Patent No.: US 11,867,637 B2
(45) Date of Patent: Jan. 9, 2024

(54) SYSTEMS FOR AUTHENTICATION AND RELATED DEVICES AND METHODS

(71) Applicant: EllansaLabs Inc., Addison, TX (US)

(72) Inventor: Omar Besim Hakim, Addison, TX (US)

(73) Assignee: EllansaLabs Inc., Addison, TX (US)

( * ) Notice: Subject to any disclaimer, the term of this patent is extended or adjusted under 35 U.S.C. 154(b) by 0 days.

(21) Appl. No.: 18/160,734

(22) Filed: Jan. 27, 2023

(65) Prior Publication Data
US 2023/0168206 A1 Jun. 1, 2023

Related U.S. Application Data

(60) Provisional application No. 63/432,864, filed on Dec. 15, 2022.

(51) Int. Cl.
*G01N 21/87* (2006.01)
*G06K 19/06* (2006.01)

(52) U.S. Cl.
CPC ....... *G01N 21/87* (2013.01); *G06K 19/06037* (2013.01)

(58) Field of Classification Search
CPC ...... G01N 21/87; G01N 33/381; G01N 21/64; G01N 21/65; G01N 21/774; G01N 19/04; G01N 2021/8477; G01N 21/958
See application file for complete search history.

(56) References Cited

U.S. PATENT DOCUMENTS

| | | | |
|---|---|---|---|
| 5,753,887 A * | 5/1998 | Rosenwasser | B44B 7/002 |
| | | | 219/121.68 |
| 7,204,428 B2 | 4/2007 | Wilson | |
| 7,537,877 B2 | 5/2009 | Yoshiba et al. | |
| 7,773,749 B1 | 8/2010 | Durst et al. | |
| 8,851,372 B2 | 10/2014 | Zhou et al. | |
| 9,239,414 B2 | 1/2016 | Rey et al. | |
| 9,269,576 B2 | 2/2016 | Yamauchi et al. | |
| 10,281,398 B2 | 5/2019 | Zheng et al. | |
| 10,471,478 B2 | 11/2019 | Gil | |
| 10,603,685 B2 | 3/2020 | Zheng et al. | |
| 10,620,121 B2 | 4/2020 | Zheng et al. | |
| 11,484,011 B2 | 11/2022 | Chapman | |
| 11,488,122 B2 | 11/2022 | Diamond et al. | |
| 11,514,689 B2 * | 11/2022 | Niskanen | G01N 21/87 |
| 11,599,650 B2 | 3/2023 | Ely | |
| 2003/0120613 A1 | 6/2003 | Neogi | |

(Continued)

FOREIGN PATENT DOCUMENTS

| | | | |
|---|---|---|---|
| AU | 2006246300 A1 * | 11/2007 | ........... G01N 21/645 |
| CN | 105539248 A | 5/2016 | |

(Continued)

OTHER PUBLICATIONS

OPSYDIA.com; Securing the Identity of Diamonds, Mar. 2022 (downloaded Mar. 1, 2023).

(Continued)

*Primary Examiner* — Michael P Stafira
(74) *Attorney, Agent, or Firm* — Dickinson Wright PLLC

(57) ABSTRACT

A gemstone includes: a table; a culet extending in parallel to the table and having an area at least 10% of a size of an area of the table; and a treatment covering at least the culet that reflects diffused light through the gemstone.

10 Claims, 31 Drawing Sheets

(56) References Cited

U.S. PATENT DOCUMENTS

| | | |
|---|---|---|
| 2004/0112087 A1 | 6/2004 | Bishop |
| 2006/0196858 A1* | 9/2006 | Barron .................. B44F 1/06 |
| | | 219/121.69 |
| 2010/0018955 A1 | 1/2010 | Martinez |
| 2010/0310839 A1 | 12/2010 | Rey et al. |
| 2012/0120465 A1 | 5/2012 | Martinez et al. |
| 2012/0167210 A1 | 6/2012 | Oro Garcia et al. |
| 2015/0213734 A1 | 7/2015 | Glickman |
| 2016/0099852 A1 | 4/2016 | Cook et al. |
| 2016/0232432 A1 | 8/2016 | Regev |
| 2016/0275585 A1 | 9/2016 | Scoggins |
| 2016/0300234 A1 | 10/2016 | Moss-Pultz et al. |
| 2017/0261855 A1* | 9/2017 | Moore .................. B44C 3/00 |
| 2018/0109494 A1 | 4/2018 | Yu et al. |
| 2018/0293474 A1 | 10/2018 | Almog |
| 2019/0114698 A1 | 4/2019 | Lutnick et al. |
| 2019/0130100 A1 | 5/2019 | Dymshits et al. |
| 2019/0355037 A1 | 11/2019 | Desai |
| 2019/0366475 A1* | 12/2019 | Scarselli .................. G06F 21/602 |
| 2019/0378145 A1 | 12/2019 | Mayer |
| 2020/0076786 A1 | 3/2020 | Spivack et al. |
| 2020/0145454 A1 | 5/2020 | Galliano et al. |
| 2020/0246681 A1 | 8/2020 | Chen |
| 2021/0027447 A1 | 1/2021 | Parikh et al. |
| 2021/0158118 A1* | 5/2021 | Benderly .................. G01N 21/87 |
| 2021/0160235 A1 | 5/2021 | Lerner |
| 2021/0287288 A1 | 9/2021 | Madisetti et al. |
| 2021/0319722 A1 | 10/2021 | Ionin et al. |
| 2021/0356402 A1 | 11/2021 | Kerner et al. |
| 2021/0358004 A1 | 11/2021 | Chang et al. |
| 2021/0137440 A1 | 12/2021 | Navot et al. |
| 2021/0390531 A1 | 12/2021 | Voorhees et al. |
| 2022/0254174 A1 | 8/2022 | Hong |
| 2023/0016065 A1 | 1/2023 | Diamond |

FOREIGN PATENT DOCUMENTS

| | | | | |
|---|---|---|---|---|
| CN | 107110788 A | * | 8/2017 | .......... G01N 21/87 |
| CN | 107480745 A | | 12/2017 | |
| CN | 109034324 A | * | 12/2018 | .......... G06K 19/022 |
| CN | 109903135 A | | 6/2019 | |
| CN | 210579489 U | | 5/2020 | |
| CN | 112908147 A | | 6/2021 | |
| DE | 202017105345 U1 | | 9/2017 | |
| DE | 102019217511 A1 | | 5/2021 | |
| DE | 102020120669 A1 | | 2/2022 | |
| EP | 3305461 A1 | * | 4/2018 | .......... B23K 26/361 |
| EP | 3305461 A1 | | 4/2018 | |
| EP | 3324176 A1 | * | 5/2018 | |
| EP | 3671674 A1 | | 6/2020 | |
| EP | 3886031 A1 | | 9/2021 | |
| EP | 2172933 A1 | | 12/2022 | |
| EP | 4102399 A1 | | 12/2022 | |
| FR | 3021325 A1 | | 11/2015 | |
| FR | 3084848 A1 | | 2/2020 | |
| IN | 29/2016 | | 7/2016 | |
| JP | 2004086828 A | | 3/2004 | |
| JP | 2016022308 A | | 2/2016 | |
| KR | 100344886 B1 | | 7/2002 | |
| KR | 20050027336 A | | 3/2005 | |
| KR | 20090123356 A | | 12/2009 | |
| KR | 20130001757 A | | 1/2013 | |
| KR | 20130140404 A | | 12/2013 | |
| KR | 101476264 B1 | | 12/2014 | |
| KR | 101734534 B1 | | 5/2017 | |
| KR | 20170116509 A | | 10/2017 | |
| KR | 20190049187 A | | 5/2019 | |
| KR | 20190108435 A | | 9/2019 | |
| KR | 20190108441 A | | 9/2019 | |
| KR | 102052735 B1 | | 12/2019 | |
| KR | 102052736 B1 | | 12/2019 | |
| KR | 102060972 B1 | | 12/2019 | |
| KR | 20190139170 A | | 12/2019 | |
| KR | 20200015650 A | | 2/2020 | |
| KR | 20200054122 A | | 5/2020 | |
| KR | 20200060311 A | | 5/2020 | |
| KR | 20200065307 A | | 6/2020 | |
| KR | 20200071802 A | | 6/2020 | |
| KR | 20200095282 A | | 8/2020 | |
| KR | 102152449 B1 | | 9/2020 | |
| KR | 20200106140 A | | 9/2020 | |
| KR | 20200113602 A | | 10/2020 | |
| KR | 20200131196 A | | 11/2020 | |
| KR | 102207713 B1 | | 1/2021 | |
| KR | 20210005837 A | | 1/2021 | |
| KR | 20210005838 A | | 1/2021 | |
| KR | 20210015495 A | | 2/2021 | |
| KR | 102286977 B1 | | 8/2021 | |
| KR | 20210098900 A | | 8/2021 | |
| KR | 20220157369 A | * | 11/2022 | |
| KR | 102473589 B1 | | 12/2022 | |
| PL | 0906398-6 A2 | | 8/2011 | |
| RU | 2719611 C1 | * | 4/2020 | .......... A44C 17/00 |
| RU | 2750068 C1 | * | 6/2021 | .......... A44C 17/00 |
| RU | 2750068 C1 | | 6/2021 | |
| TW | 200536733 A | | 11/2005 | |
| TW | M508306 U | | 9/2015 | |
| TW | M534739 U | | 1/2017 | |
| TW | 201743243 A | | 12/2017 | |
| TW | 202236418 A | | 9/2022 | |
| WO | WO-2006119561 A1 | * | 11/2006 | .......... G01N 21/645 |
| WO | 2009092794 A2 | | 7/2009 | |
| WO | 2010081986 A1 | | 7/2010 | |
| WO | 2012048510 A1 | | 4/2012 | |
| WO | 2015125134 A1 | | 8/2015 | |
| WO | 2016124176 A1 | | 8/2016 | |
| WO | 2017145004 A1 | | 8/2017 | |
| WO | 2019088358 A1 | | 5/2019 | |
| WO | 2019177184 A1 | | 9/2019 | |
| WO | 2020096097 A1 | | 5/2020 | |
| WO | 2020101097 A1 | | 5/2020 | |
| WO | 2020105752 A1 | | 5/2020 | |
| WO | WO-2020161462 A1 | * | 8/2020 | .......... B23K 26/03 |
| WO | 2021075651 A2 | | 4/2021 | |
| WO | 2021095795 A1 | | 5/2021 | |
| WO | 2021155054 A1 | | 8/2021 | |
| WO | 2021209952 A1 | | 10/2021 | |
| WO | 2022127759 A1 | | 6/2022 | |
| WO | 2022224044 A1 | | 10/2022 | |
| WO | 2022243840 A1 | | 11/2022 | |
| WO | WO-2022243840 A1 | * | 11/2022 | |
| WO | 2023063996 A1 | | 4/2023 | |

OTHER PUBLICATIONS

International Search Report and Written Opinion for PCT Application No. PCT/US2022/048070, dated Mar. 6, 2023, 10 pages.
International Search Report and Written Opinion for PCT Application No. PCT/US2022/036842, dated Jan. 16, 2023, 12 pages.
International Search Report and Written Opinion for PCT Application No. PCT/US2022/025591, dated Jan. 18, 2023, 20 pages.
Tharaka Hewa et al., "Survey on Blockchain based Smart Contracts: Applications, Opportunities and Challenges" Journal of Network and Computer Applications, Sep. 21, 2020, 56 pages.

* cited by examiner

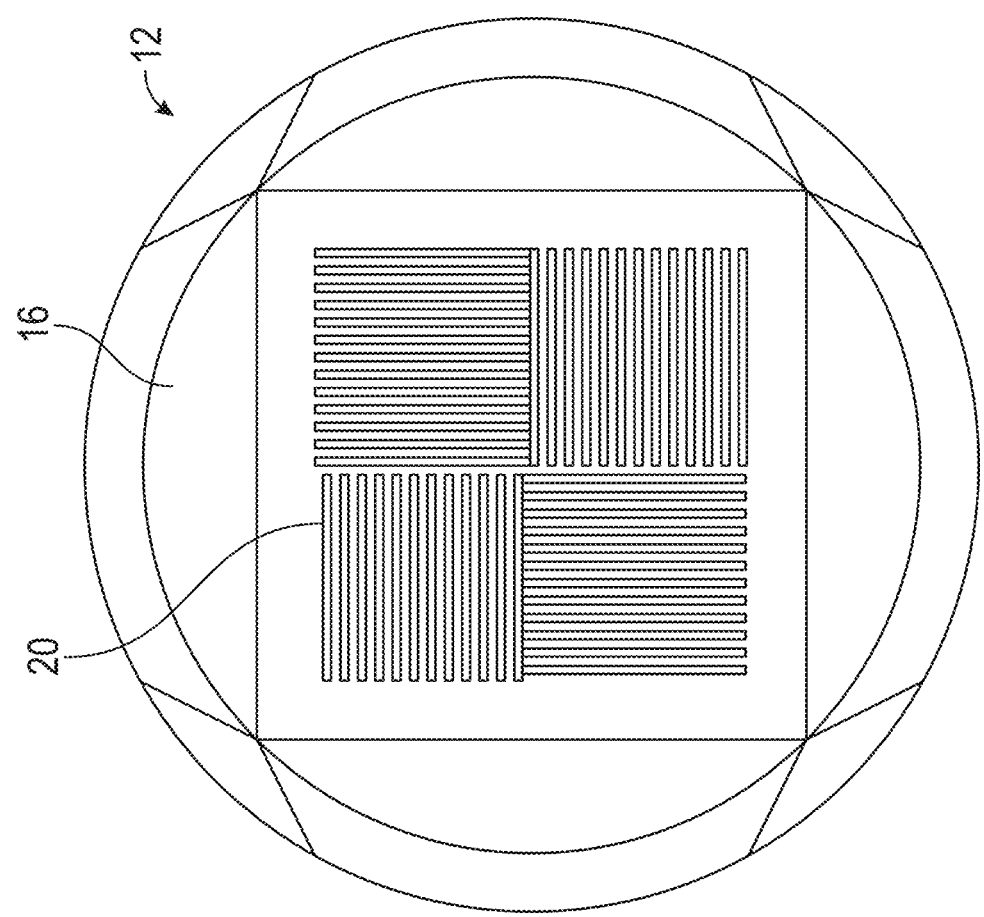
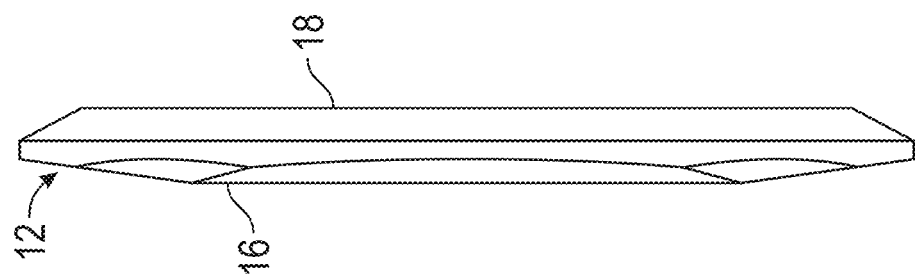
FIG. 22B
FIG. 22A

SYSTEMS FOR AUTHENTICATION AND RELATED DEVICES AND METHODS

CROSS-REFERENCE TO RELATED APPLICATION

The present disclosure claims the benefit of Provisional Patent Application No. 63/432,864, filed on Dec. 15, 2022 and entitled "SYSTEMS FOR AUTHENTICATION AND RELATED DEVICES AND METHODS", the contents of which is incorporated by reference in its entirety.

TECHNICAL FIELD

The present specification generally relates to gemstones and, more specifically, gemstones with reduced brightness.

BACKGROUND

Traditional gemstones are cut to maximize an amount of light that passes and is reflected through the gemstone, resulting in increased brightness and fire of the gemstone. The amount of brightness and fire in a gemstone relates to the desirability and cost of the gemstone, where the cost of the gemstone generally increases with an increase in the brightness and fire of the gemstone. However, increased brightness affects the ability to view the interior of the gemstone.

SUMMARY

In one embodiment, a gemstone includes: a table; a culet extending in parallel to the table and having an area at least 10% of a size of an area of the table; and a treatment covering at least the culet that reflects diffused light through the gemstone.

In another embodiment, a scanning device for scanning a scanable indicia in a gemstone, the scanning device includes: a scanner configured to read the scanable indicia; a light source configured to illuminate the scanable indicia; and a controller communicatively coupled to the scanner to be configured to determine whether the scanable indicia is below a table of the gemstone.

In yet another embodiment, a method of cutting a gemstone, the method includes: cutting a table and a culet extending in parallel to the table, the culet having an area at least 10% of a size of an area of the table; treating the culet with a treatment that reflects diffused light through the gemstone; and forming a scanable indicia within the gemstone.

In yet another embodiment, a transparent material includes: a table; a culet extending in parallel to the table and having an area at least 10% of a size of an area of the table; a treatment covering at least the culet that reflects diffused light through the gemstone; and a scanable indicia positioned between the table and the culet.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 22A and 22B depict side and front views of the gemstone of FIG. 1 having a thickness of 0.5 mm, according to one or more embodiments shown and described herein;

DETAILED DESCRIPTION

Figure 1:
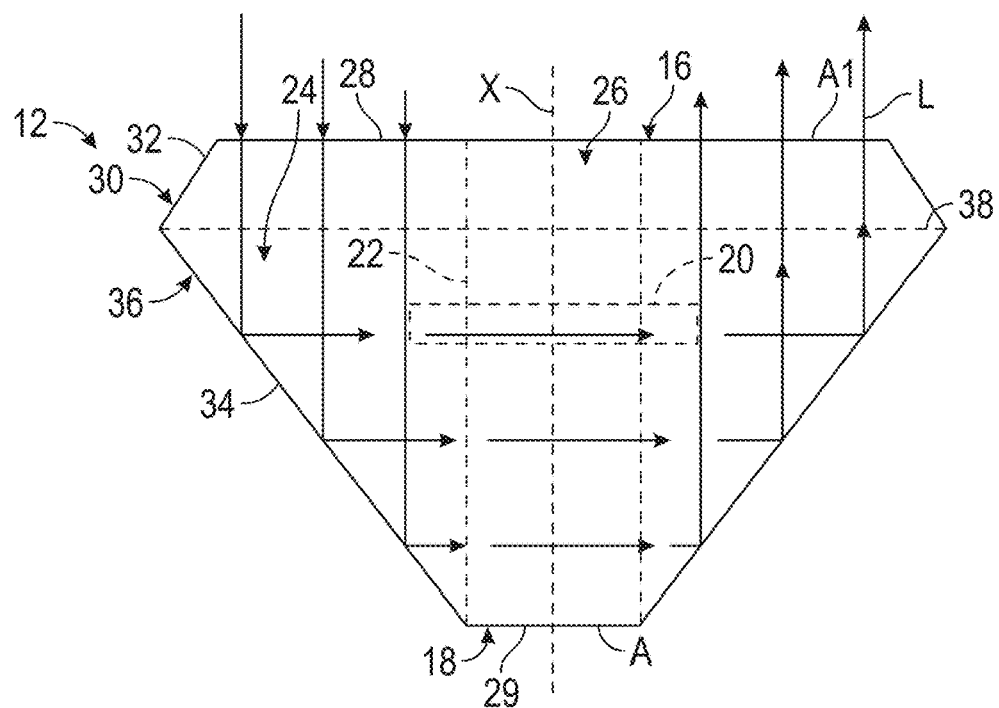
FIG. 1 depicts a side view of a gemstone with light passing therethrough, according to one or more embodiments shown and described herein.

FIGS. 1-11 generally depicts a system 10 (FIG. 9C) and a method 100 (FIG. 10A) for authenticating an item. The system 10 generally includes a gemstone 12 and a scanning device 14. Referring to FIGS. 1-8, the gemstone 12 may be any traditional gemstone that can be etched or laser treated, such as a diamond, a sapphire, a ruby, an emerald, or the like. As used herein, a "gemstone" may refer to either of a lab-grown gemstone (e.g., formed in a lab), or a natural gemstone (e.g., formed in earth and obtained through mining). For further example, this may include a lab-grown diamond and/or a natural diamond. It is further contemplated and possible that the current disclosure may be applied to another transparent material aside from a gemstone, such as polymers, plastics, glass, thin films, perspex, polycarbonate, polypropylene, or the like. Accordingly, while the gemstone 12 is used throughout the current disclosure, each of the below elements and embodiments may be applied to the transparent materials described above. As used herein, "transparent" may be used to refer to semi-transparent materials that permit a marking positioned within the material to be readable.

The gemstone 12 may include a table 16, a culet 18 extending in parallel with the table 16, a girdle 38, a crown 30 extending from the table 16 to the girdle 38, a pavilion 36 extending from the girdle 38 to the culet 18, and an indicia 20. However, it is contemplated and possible that the gemstone 12 may be cut to include any combination of the above, or surfaces and portions in addition to the above. For example, a gemstone 12 as described herein may not include a culet 18. For further example, the gemstone 12 may be puck or wafer shaped having the table 16 and the culet 18 be the same or similarly sized and a single surface, such as the girdle 38, extending between the table 16 and the culet 18.

Referring again to FIGS. 1-8, the gemstone 12 may define an axis X extending through a geometric center of the gemstone 12 to extend substantially perpendicular through the table 16 and the culet 18, such that the culet 18 extends substantially parallel to the table 16. The culet 18 may define an area A1 that may be at least 10% of a size of an area A2 of the table 16, such as, for example, 80% of the size of the area A2. It is further contemplated and possible that the area A1 is 50% of the size of the area A2, 60% of the size of the area A2, 70% of the size of the area A2, 90% of the size of the area A2, or the like. The gemstone 12 may have a thickness between the table 16 and the culet 18 that is between 1.2 mm and 0.5 mm, including both 1.2 mm and 0.5 mm. The culet 18 may be bruted to reduce the transparency of the culet 18, reducing an amount of light passing through the culet 18. The culet 18 may be bruted by, for example, a diamond-grit sandpaper or scratching the culet 18 with another diamond.

Figure 2:
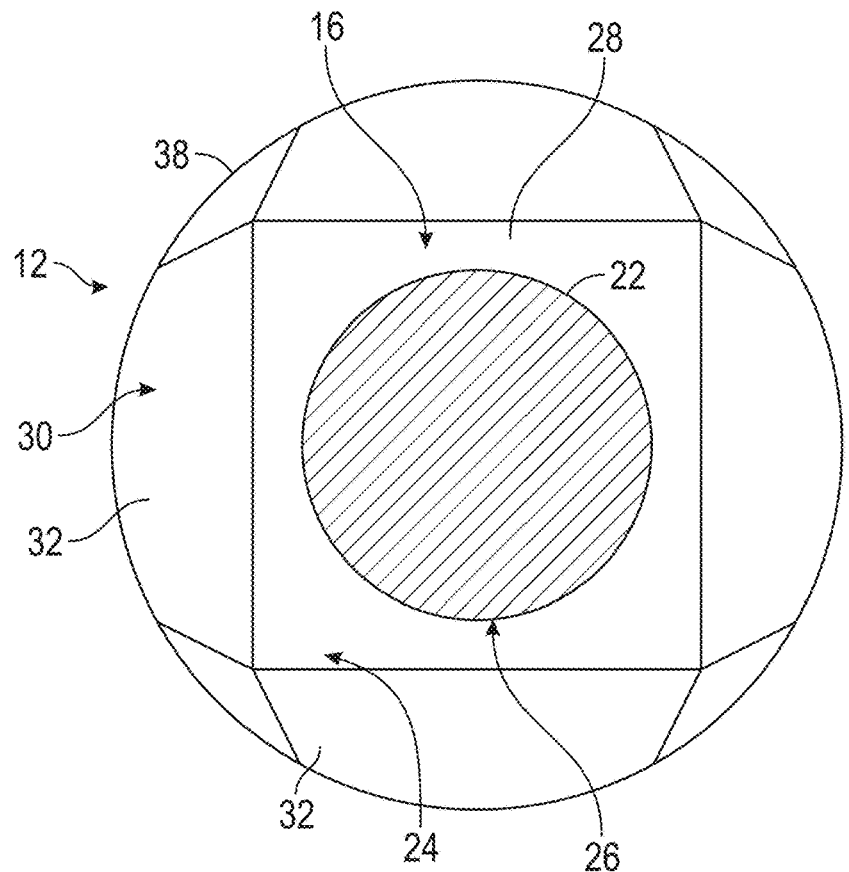
FIG. 2 depicts a top view of the gemstone of FIG. 1 having an illuminated portion and a nonilluminated portion, according to one or more embodiments shown and described herein.
Figure 4:
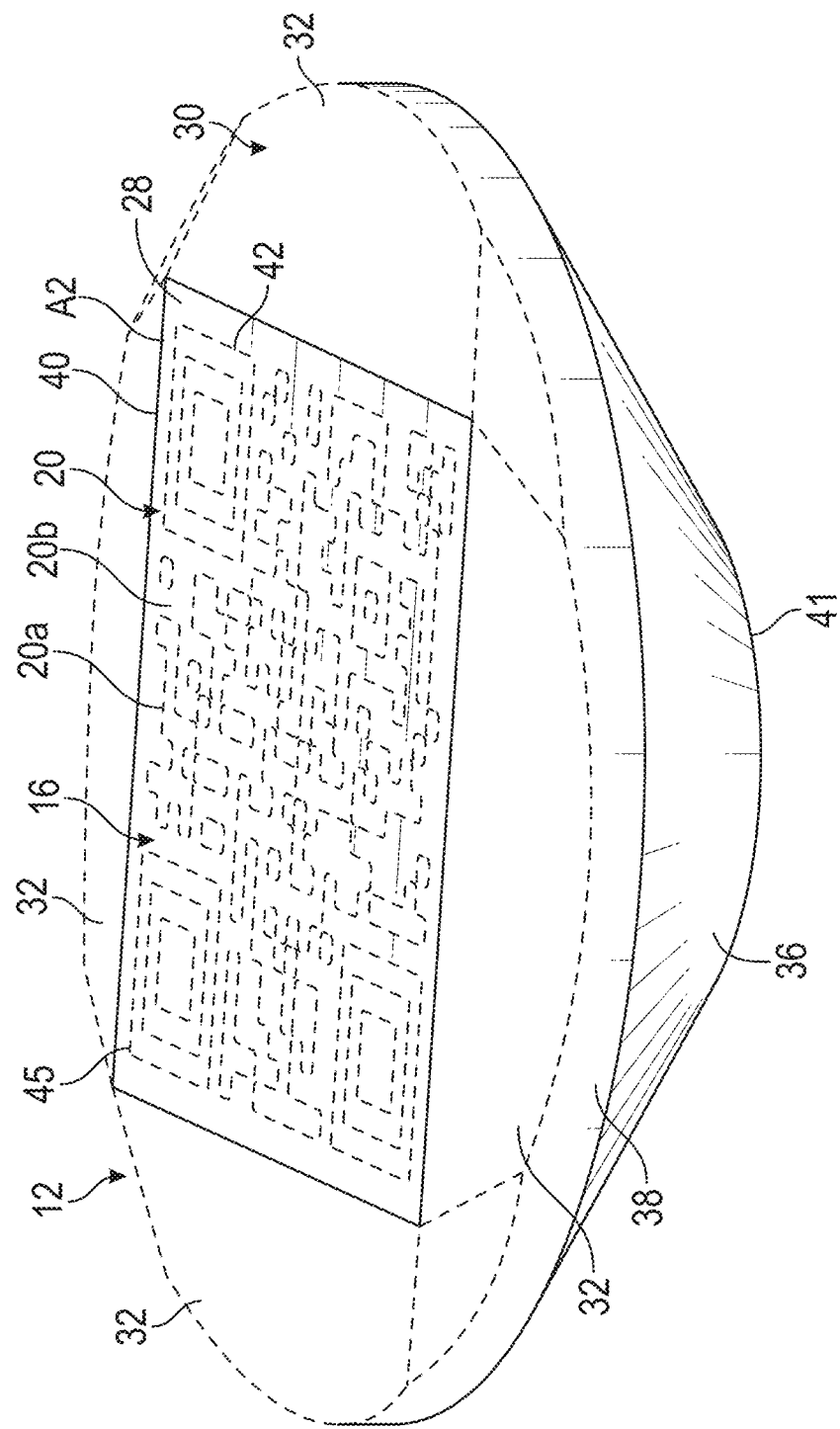
FIG. 4 depicts a top perspective view of the gemstone of FIG. 3, according to one or more embodiments shown and described herein.
Figure 7:
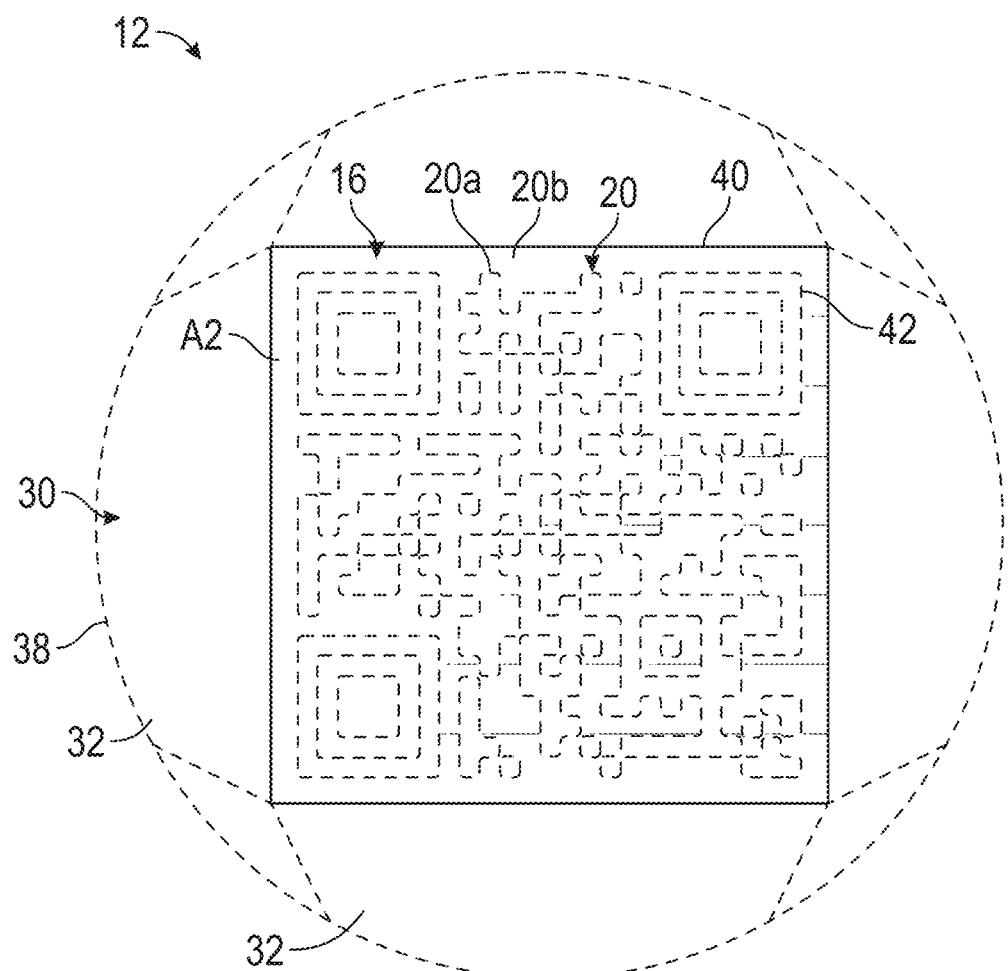
FIG. 7 depicts a top view of the gemstone of FIG. 3, according to one or more embodiments shown and described herein.
Figure 8:
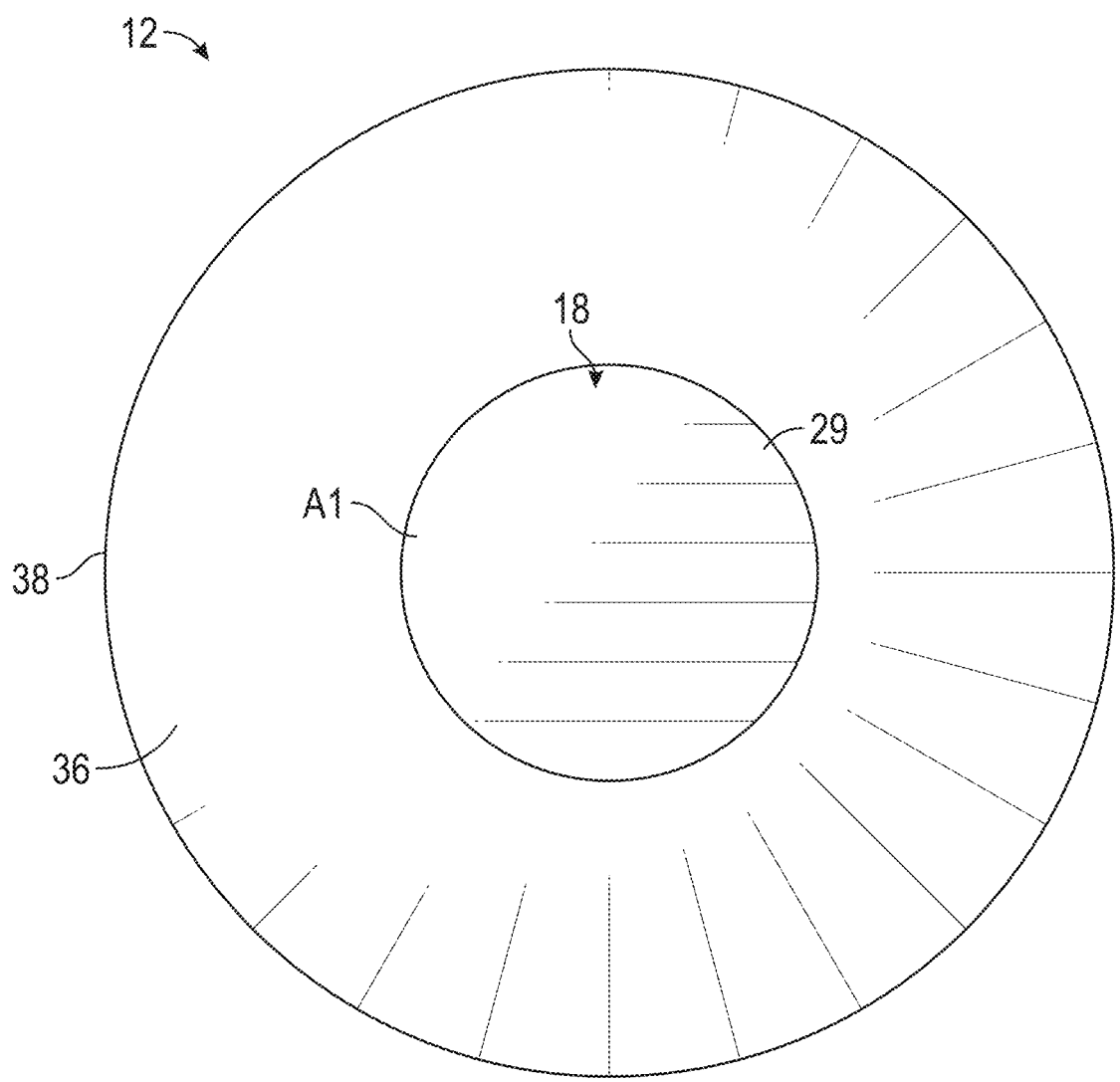
FIG. 8 depicts a bottom view of the gemstone of FIG. 3, according to one or more embodiments shown and described herein.

The crown 30 may extend obliquely to the table 16, and may extend from the table 16 to the girdle 38. The pavilion 36 may extend obliquely from the culet 18 to the girdle 38, with the girdle 38 disposed between the crown 30 and the pavilion 36. The crown 30 may include a plurality of facets 32 that abut a perimeter of the table 16 to define a shape of the table 16 such that the table 16 may have a shape selected from one of an octagon, hexagon, pentagon, square, rectangle, circle and triangle. For example and as depicted in FIGS. 2, 4, and 7, the crown 30 may include four facets 32 such that the table 16 is shaped as a rectangle, such as a square. As will be discussed in further detail below, it is further contemplated and possible that the table 16 may have any operable shape for framing the indicia 20.

The pavilion 36 may be rounded, such that the pavilion 36 does not include any facets. In other words, the pavilion 36 may have a smooth, curved surface about a circumference of the pavilion 36 encircling the axis X. However, it is contemplated and possible that the pavilion 36 may include facets. In such embodiments, the number of facets in the pavilion 36 may define a shape of the culet 18 where, for example, the pavilion 36 includes four facets, the culet 18 may be shaped as a rectangle, such as a square. In other embodiments, the culet 18 may be circular in shape. In any of the embodiments, the pavilion 36 may be bruted to reduce the transparency of the pavilion 36. The pavilion 36 may be bruted by, for example, a diamond-grit sandpaper.

The shape of the gemstone 12 affects the amount of light passing through the gemstone 12, thereby affecting the brightness of the gemstone 12. As shown in FIG. 1, light L enters into the gemstone 12 through the table 16 to reflect off of the pavilion 36 on one side of the gemstone 12 to the pavilion 36 on the other side of the gemstone 12, and out through the table 16. This reflection of light L causes the gemstone 12 to appear bright (e.g., sparkle) when viewed. The trajectory of light L described above and shown in FIG. 1 is merely exemplary, such that the light L may pass through any portion of the gemstone 12 and reflect off of any of the pavilion 36, the crown 30, the girdle 38, the table 16, and the culet 18. When light L enters the table 16 along the axis X and through the table 16 at a location where the orthographic projection 22 of the area A1 intersects the table 16, the light L passes through the culet 18 without reflecting off the pavilion 36, thereby reducing the amount of light that passes out of the table 16. With the reduced light passing through the table 16, the gemstone 12 has an illuminated portion 24 and a nonilluminated portion 26 separate from the illuminated portion 24, the illuminated portion 24 having a greater brightness than a brightness of the nonilluminated portion 26. It is contemplated and possible that light may still pass through the nonilluminated portion 26, where the nonilluminated portion 26 is less bright than the illuminated portion 24. The nonilluminated portion 26 may be a volume of the gemstone 12 that intersects the orthographic projection 22 of the area A1 of the culet 18 along the axis X. In embodiments, the nonilluminated portion 26 may be an area of the table 16 or the entire volume of the gemstone 12 that intersects the orthographic projection 22 of the area A1 of the culet 18 along the axis X. When a surface of the gemstone 12 is bruted, such as the culet 18 or the pavilion 36, light passing through the respective surface is reduced due to the opacity of the bruted surface. Accordingly, the bruted surfaces further reduce the light passing through the gemstone 12 and reduces the brightness of the gemstone 12.

Figure 3:
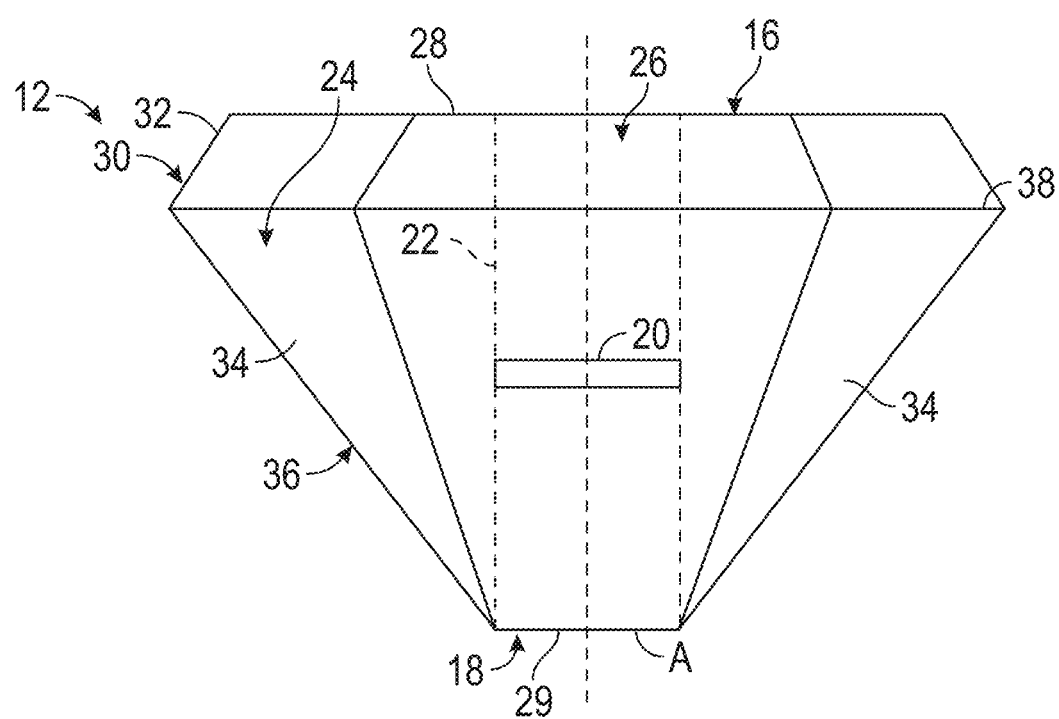
FIG. 3 depicts a side view of the gemstone of FIG. 1 having a scanable indicia etched therein, according to one or more embodiments shown and described herein.

Referring to FIGS. 3, 4, and 7, the indicia 20 may be a scanable indicia 20, such as a barcode (e.g., a QR code) or any other code that may be scanned to convey information. The indicia 20 may act as a means for conveying information when scanned by a scanning device. For example, a QR code may convey information, such as a web address, when scanned by the scanning device 14. The QR code may be any standard QR code, including micro QR codes. The QR code may conform to the QR code standards set out in https://en.wikipedia.org/wiki/QR_code and https://www.qrcode.com/en/codes/microqr.html, each of which are incorporated by reference in their entireties.

Barcodes, including QR codes, require contrast between the barcode and the medium that the barcode is positioned on. For example, the barcode may appear darker than the medium so that the barcode may be recognizable and/or scanable by a barcode scanner. Without contrast, the barcode may not properly be scanned by a scanner. The indicia 20 may be formed in the gemstone 12 at the nonilluminated portion 26, where the indicia 20 has an laser treated portion 20a (appears black) and an untreated portion 20b (appears white). The laser treated portion 20a is formed by laser treating a location within the gemstone 12 that turns the carbon atoms of the gemstone 12 into graphene, causing the laser treated portion 20a to appear darker than the untreated portion 20b. The darkness of the laser treated portion creates a contrast with the untreated portion 20b of the gemstone 12, thereby forming the indicia 20 capable of being scanned by the scanning device 14. The laser treated portion 20a may include a plurality of pixels that each have a width. In the embodiments that the barcode is a QR code, the data points may be squares. The QR code may be sized relative to the table 16 to have a margin spacing the perimeter of the QR code from the perimeter of the table 16, where the margin is at least 4 times the width of the data point. The culet 18 may be sized to have a width that is equal to or greater than a width of the QR code. In embodiments where the culet 18 is circular, the width is equal to a diameter of the culet 18.

When positioned at the nonilluminated portion 26, the contrast between the laser treated portion 20a and the untreated portion 20b is increased, such that the laser treated portion 20a is more visible. As discussed in further detail below, the indicia 20 may be formed at a position in the gemstone 12 such that light L reflecting off of the pavilion 36 may intersect the indicia 20 and reflect off of the indicia 20 to create further contrast between the laser treated portion 20a and the untreated portion 20b. As shown in FIG. 4, when the indicia 20 is positioned inside the gemstone 12, the indicia 20 may appear to be at or near the table 16 due to refraction of the light L passing through the gemstone 12.

As depicted in FIG. 3, the indicia 20 may be formed in the gemstone 12 below a surface 28 of the table 16 so that the scanable indicia 20 is positioned in an interior of the gemstone 12 below each outer surface of the gemstone 12. In other words, the indicia 20 is formed in the gemstone 12 to be positioned between the surface 28 of the table 16 and the surface 29 of the culet 18. The indicia 20 may be positioned below the girdle 38, between the girdle 38 and the culet 18. Alternatively, it is contemplated and possible that the indicia 20 is formed in the surface 28 of either of the table 16 or the surface 29 of the culet 18 to be positioned on one of the surfaces 28, 29. It is further contemplated and possible that the etching is formed on a surface of one gemstone 12 that is then fused with another gemstone 12 with the etching positioned between the gemstones, such that the etching is positioned between a table 16 and a culet 18 of a gemstone 12 that is formed by the two gemstones. The indicia 20 may be at least partially positioned within an orthographic projection 22 of the area A extending along the axis X, so that, when viewed along the axis X, the indicia 20 is positioned to overlap with the table 16 and the culet 18. When positioned in the nonilluminated portion 26 to overlap with the table 16 and the culet 18, the contrast between the laser treated portion 20a and the untreated portion 20b is increased as light reflected from the facets 32 and pavilion 36 does not pass through the orthographic projection 22 of the area A along the axis X. Additionally, light L reflected from the facets 32 and pavilion 36 passes through the orthographic projection 22 of the area A at an angle perpendicular to the axis X to intersect the indicia 20, thereby reflecting light off of the indicia 20 and increasing the brightness of the indicia 20, thereby further increasing the contrast between the laser treated portion 20a and the untreated portion 20b.

In embodiments, the gemstone 12 may include a treatment, or surface treatment, that reflects diffused light through the gemstone (such as a coating, bruting, paint, resin, adhesive, or the like) below the girdle 38, including the pavilion 36 and the culet 18. The surface treatment further increases contrast and restricts light L from passing through the gemstone 12 below the girdle 38. The surface treatment enables maximum contrast between the indicia 20 and a background when the indicia 20 is read from about the table 16. The surface treatment may be a white, light-colored enamel, or any other color that reflects diffused light, and may not be a mirrored finish. In embodiments, the surface treatment may have a color that increases contrast of the indicia 20, such as a perfect white (with 100% Lambertian reflectance scatter model), a perfect gray (with 50% Lambertian reflectance scatter model), or a perfect black (with faces having 100% or near 100% light absorption). In other embodiments, the surface treatment may not be on the gemstone 12, and may otherwise be on a background surface that the gemstone 12 is attached to, with the indicia 20 between the background surface and the table 16. In embodiments where the surface treatment is bruting, a diamond-grit sandpaper, a diamond, or the like may be used to abrade the surface of the gemstone 12 to increase a surface roughness to increase an opacity of the surface. The surface treatment may not be a polishing or the like that decreases surface roughness of the gemstone 12. In some embodiments, the surface treatment may include cutting or formation of the surface (e.g., cutting the culet), faceting the surface to have a diffusing pattern, or the like.

Figure 5:
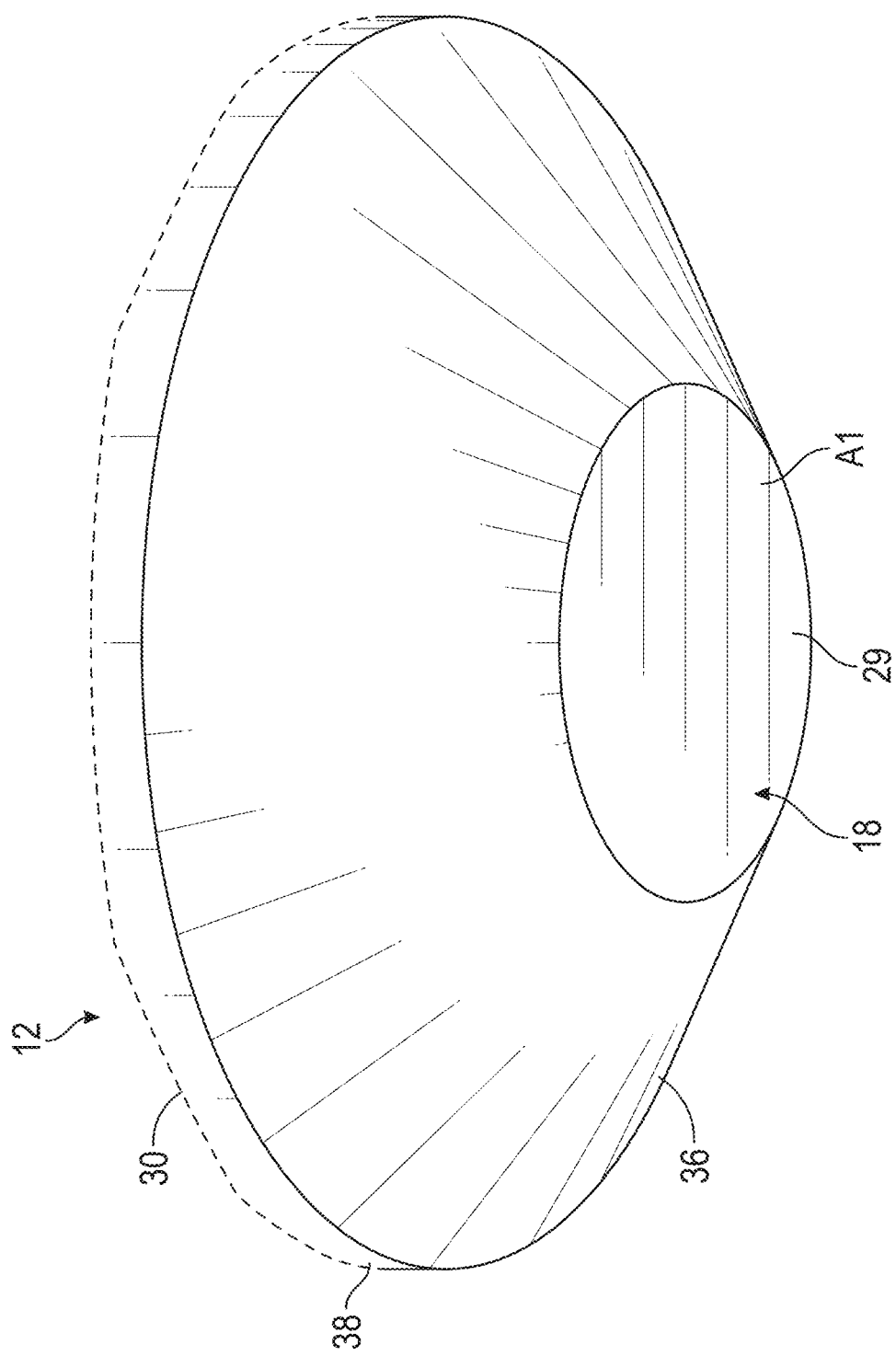
FIG. 5 depicts a bottom perspective view of the gemstone of FIG. 3, according to one or more embodiments shown and described herein.
Figure 6:
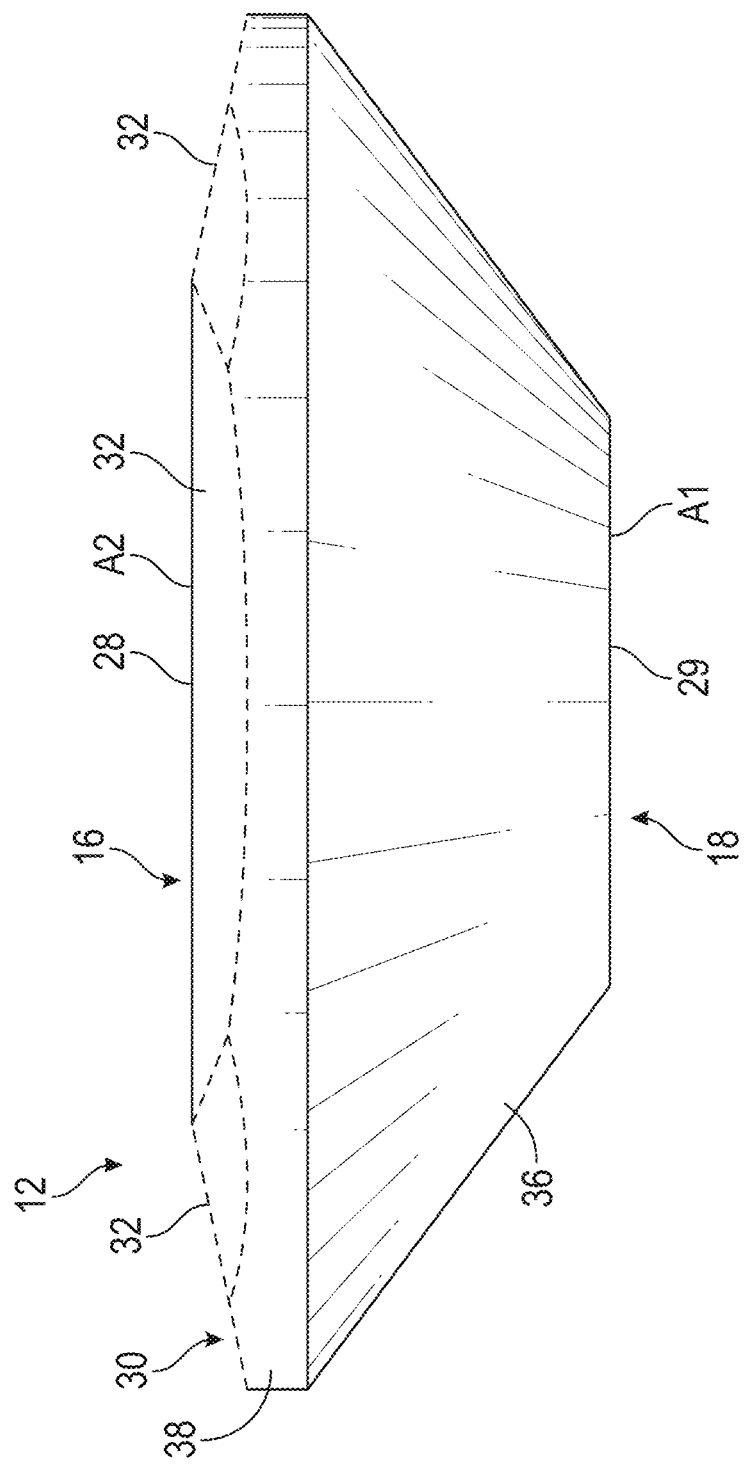
FIG. 6 depicts a side view of the gemstone of FIG. 3, according to one or more embodiments shown and described herein.

As shown in FIGS. 4 and 5, the indicia 20 may have a size that is capable of being viewed without specialized equipment, such as a microscope. The indicia 20 may be sized relative to the size of the table 16, as discussed herein, such that an increase in the size of the table 16 results in an increase in the size of the indicia 20. It is further contemplated and possible that the indicia 20 may be any size capable of fitting within the gemstone 12 and being readable, such as, for example, having a width that is equal to or greater than 0.1 mm, or more particularly, 0.25 mm to have an area of 0.25 mm by 0.25 mm. In some embodiments, the indicia 20 may have an area of 2.9 mm by 2.9 mm, and be formed in the gemstone 12 250 μm below the table 16. For further example, the indicia 20 may be visible and/or scanable between 1× and 10× magnification, such as by a camera on a cell phone, and more particularly, between 1× and 9× magnification. However, it is contemplated and possible that the indicia 20 may be visible in a range between 1× and 100×, where the indicia 20 would be microscopic. In further embodiments, the indicia 20 may visible in a range of 1× to 50×, 1× to 25×, 1× to 15×, 1× to 8×, 1× to 7×, 1× to 6×, 1× to 5×, 1× to 4×, 1× to 3×, 1× to 2×, or the like. As shown in FIGS. 4 and 7, the indicia 20 may be sized to have an area equal to or less than an area of the table 16 so that, when viewed along the axis X, the indicia 20 is framed by a perimeter 40 of the table 16 with the perimeter 40 of the table 16 surrounding the indicia 20. The indicia 20 may be positioned so that each side of a perimeter 42 of the indicia 20 extends in parallel with a side of the perimeter 40 of the table 16. The indicia 20 may additionally be sized so that the area of the indicia 20 is larger than an area of the culet 18. The perimeter 42 of the indicia 20 may be spaced apart from the perimeter 40 of the table 16 a distance, the distance being equal along each side of the perimeter 42 of the indicia 20. The distance may be the margins discussed above, where the distance is equal to or greater than four pixels. This is to conform the indicia 20, or QR code, to QR code specifications, permitting the QR code to be scanable. The culet 18 may be sized to have a width that is equal to or greater than a width of the indicia 20. In embodiments where the culet 18 is circular, the width of the culet may be the diameter of the circle, where the diameter is equal to or greater than a length of a side of the indicia 20. In further embodiments, the culet 18 may be sized such that an orthographic projection of the culet 18 along the axis X completely covers the indicia 20. In other words, a perimeter 41 of the culet 18 circumferentially surrounds the perimeter 42 of the indicia 20 to cover corners 45 of the indicia 20. In some embodiments, the culet 18 may be sized so that the area A1 of the culet 18 is about 80% of the area A2 of the table 16.

The scanable indicia 20 may be configured to be scanned by the scanning device 14 (FIGS. 9A-9C), and further configured to transfer information to the scanning device 14. In some embodiments, the scanable indicia 20 may be used to authenticate the gemstone 12, such as, for example, identifying the location that the gemstone 12 was mined, cut, or the like. The gemstone 12 may be attached to an item, such as clothing, accessories, artwork, picture frames, jewelry, or the like, such that the scanable indicia 20 may be used to authenticate the item that the gemstone 12 is attached to. The gemstone 12 may act as a Web 3-enabled asset tag. In such embodiments, the gemstone 12 may be attached to the item with any traditional setting, including a bezel setting. The scanable indicia 20 may additionally or alternatively be used in any traditional manner that a barcode is used, such as, for example, to gain access to an exclusive event or location, to link to a website to view information or send/view a message, or the like.

Figure 9A:
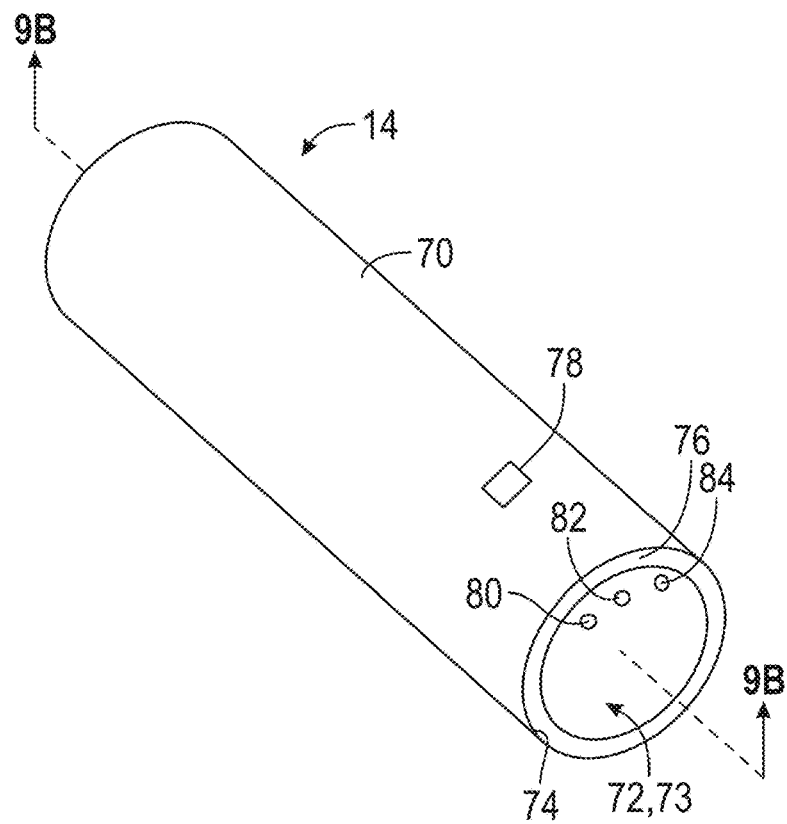
FIG. 9A depicts a perspective view of a scanning device for scanning the scanable indicia of the gemstone of FIG. 3, according to one or more embodiments shown and described herein.
Figure 9B:
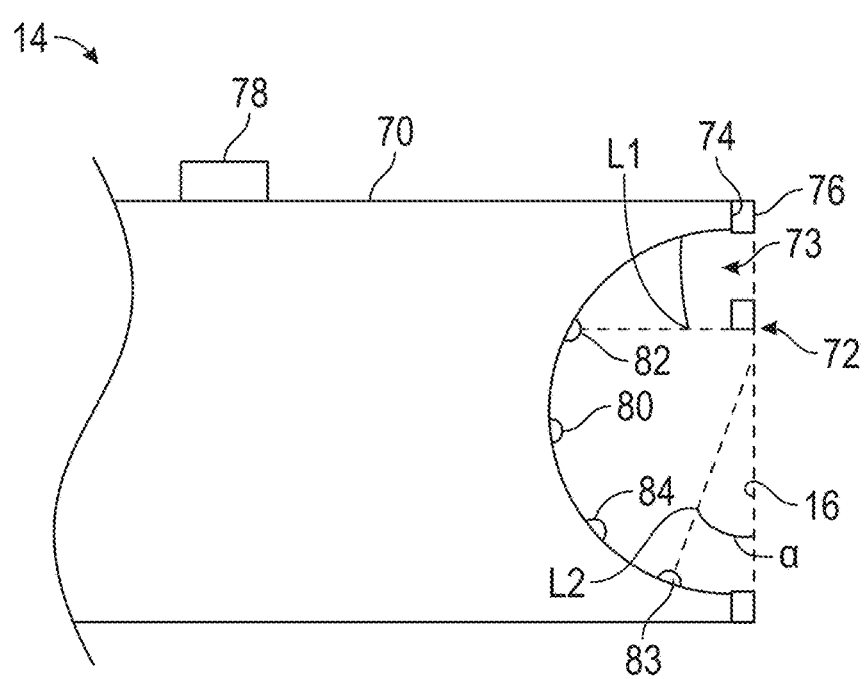
FIG. 9B depicts a cross-sectional view of the scanning device of FIG. 9A taken along line 9B-9B, according to one or more embodiments shown and described herein.

Referring to FIGS. 9A and 9B, the scanning device 14 is depicted. The scanning device 14 may include an elongated body 70 defining a cavity 73 and an opening 72 extending into the cavity 73 at an end 74 of the body 70, a sealing member 76 at the end 74, an indicator 78 coupled to the body 70, a scanner 80, a light source 82, and a diamond sensor 84. The cavity 73 may be concave and, for example, dome-shaped, forming a concave hemisphere at the end 74 of the body 70, and the body 70 may have a paint or surface treatment that increases the reflectance of light without the cavity 73. The paint may be, for example, white to increase the reflectance. The sealing member 76 may be positioned at and coupled to the end 74 of the body 70, and may be ring-shaped to allow light to pass through the sealing member 76 into or from the cavity. The sealing member 76 may act to create a seal when the end 74 of the body 70 is pressed against the table 16 of the gemstone 12 to reduce or eliminate light interference from ambient sources when the scanning device 14 is scanning the gemstone 12. Examples of ambient sources include the sun, artificial light sources including lamps or ceiling lights, or the like. The indicator 78 indicates whether the gemstone 12, when scanned by the scanning device 14, is either authentic or a duplicate, as will be described in greater detail below.

The scanner 80 may be coupled to the body 70 inside the cavity 73 at an apex of the dome-shaped cavity 73. In other words, the scanner 80 may be positioned in the cavity 73 furthest from the end 74. The scanner 80 faces the opening 72 to be operable to scan, or read, the indicia 20, and may be any device capable of reading a scanable indicia, such as a camera. In embodiments, the scanner 80 may be a high-resolution camera. In other embodiments, the scanner 80 may be a digital microscope. It is contemplated and possible that the digital microscope may be a generic digital microscope with all possible permutations. In embodiments, the scanner 80 may have a fixed focal distance, where the focal distance may be a depth of the cavity 73 or, in other words, a distance between the scanner 80 and the end 74 of the body 70 where the gemstone 12 would be positioned when scanned by the scanning device 14. The light source 82 may be positioned adjacent the scanner 80 in the cavity 73, near the apex, and aligned to create light along an axis L1 that is perpendicular to the table 16 when the end 74 is pressed against the table 16 of the gemstone 12. The light source 82 generates light to be configured to illuminate the gemstone 12 and the indicia 20 to better view the indicia 20. The scanning device 14 may include a second light source 83 that emits a light along axis L2 that is at an angle α relative to the table 16, where the angle α may be about 10°. However, it is contemplated and possible that the axis L2 that the light from the second light source is greater than or less than 10°. As will be described in greater detail below, the scanner 80 may be configured to detect a reflectivity of the table 16 based on the light from the second light source 83.

The diamond sensor 84 is operable to detect whether an object pressed against the end 74 and scanned by the scanner 80 is a diamond. In some embodiments, the diamond sensor 84 may be a thermal probe that contacts the table 16 or other surface of the gemstone 12 to determine whether the gemstone 12 is a diamond. In such embodiments, the thermal probe is heated to a predetermined temperature, and includes a sensor that monitors the temperature of the thermal probe. When the thermal probe contacts the gemstone 12, the sensor measures the rate of heat loss of the thermal probe that passes to the gemstone 12 and, if the rate of heat loss is within a predetermined range of temperatures, the thermal probe may confirm that the gemstone 12 is a diamond. In some embodiments including the heat probe, the heat probe may telescope out of the body 70 and into the cavity 73 towards and away from the opening 72.

In other embodiments, the diamond sensor 84 may be an optical diamond sensor including a scanner or camera that detects a fluorescence of the table 16 when illuminated by one of the light source 82 and the second light source 83. The scanner or camera may be the scanner 80 discussed above. In such embodiments, one of the light sources 82, 83 emits a predetermined frequency of light that causes the gemstone 12 to fluoresce. In embodiments that the gemstone 12 is a diamond, the predetermined frequency of light may have a wavelength range of 100-400 nm such that the light is ultraviolet (UV) light and, more specifically, may be on a range of 315-400 nm, 280-315 nm, 100-280 nm, or the like, to cause the diamond to appear blue.

Figure 9C:
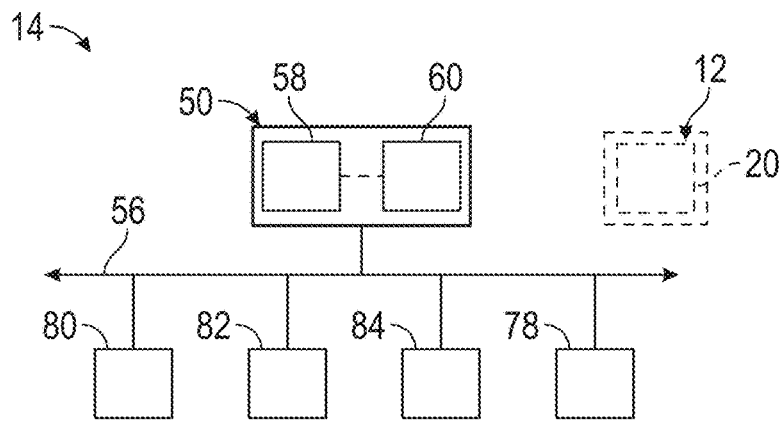
FIG. 9C schematically depicts an electronic architecture of the scanning device of FIG. 9A, according to one or more embodiments shown and described herein.

Referring to FIG. 9C, the electronic architecture of the scanning device 14 is depicted, and may include a controller 50, the scanner 80, the indicator 78, the light source 82, and the diamond sensor 84. While the scanning device 14 is depicted in FIGS. 9A and 9B, in some embodiments, the scanning device 14 may be a portable device, such as a smartphone, a tablet, a laptop, or the like. However, it is further contemplated and possible that the scanning device 14 may be a non-portable device, such as, for example, a desktop. The controller 50, the scanner 80, and the indicator 78 may be communicatively coupled via a communication path 56 that provides signal interconnectivity between various components and/or modules of the scanning device 14. As such, the controller 50 may include an input/output (I/O) interface configured to provide digital and/or analog inputs and outputs. The I/O interface can be used to transfer information between internal storage and external input and/or output devices (e.g., display). The I/O interface can include associated circuity or BUS networks to transfer such information. Such a BUS or associated circuity can allow the components to be communicatively coupled. As used herein, the term "communicatively coupled" means that coupled components are capable of exchanging data signals with one another such as, for example, electrical signals via conductive medium, electromagnetic signals via air, optical signals via optical waveguides, and the like.

The controller 50 includes a processor 58 and a non-transitory electronic memory 60 to which various components are communicatively coupled. In some embodiments, the processor 58 and the non-transitory electronic memory 60 and/or the other components are included within a single device. In other embodiments, the processor 58 and the non-transitory electronic memory 60 and/or the other components may be distributed among multiple devices that are communicatively coupled. The controller 50 includes non-transitory electronic memory 60 that stores a set of machine-readable instructions. The processor 58 executes the machine-readable instructions stored in the non-transitory electronic memory 60. The machine-readable instructions may include software that controls operation of the processor 58 to perform the operations described herein to be performed by the controller 50. The non-transitory electronic memory 60 may include volatile memory and non-volatile memory for storing instructions and data. The non-volatile memory may include solid-state memories, such as NAND flash memory, magnetic and optical storage media, or any other suitable data storage device that retains data when the processor is deactivated or loses electrical power. Non-volatile storage may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The volatile memory may include static and/or dynamic random-access memory (RAM), flash memory, cache memory, or other memory capable of storing program instructions and data. In short, the non-transitory electronic memory 60 may include RAM, ROM, flash memories, hard drives, or any device capable of storing machine-readable instructions such that the machine-readable instructions can be accessed by the processor 58 to output a control signal for the controller 50 to act on. The non-transitory electronic memory 60 may be implemented as one memory module or a plurality of memory modules.

The processor 58 may be any device capable of executing machine-readable instructions. For example, the processor 58 may be or include an integrated circuit, a microchip, a computer, a microprocessor, a micro-controller, a digital signal processor, a microcomputers, a central processing unit, field programmable gate arrays, programmable logic devices, state machines, logic circuits, analog circuits, digital circuits, or any other devices that manipulate signals (analog or digital) based on computer-executable instructions residing in memory. The non-transitory electronic memory 60 and the processor 58 are coupled to the communication path 56 that provides signal interconnectivity between various components and/or modules of the scanning device 14. Accordingly, the communication path 56 may communicatively couple any number of processors with one another, and allow the modules coupled to the communication path 56 to operate in a distributed computing environment.

The scanner 80 may be configured to scan the scanable indicia 20, and send a signal to the controller 50 indicative of the information of the scanable indicia 20. The scanner 80 may be mounted directly to the scanning device 14 as described above, or, in embodiments, separately connected thereto, such as by a universal serial bus (USB), wireless communication (e.g., WiFi, 3G, 4G, 5G, Bluetooth, etc.) or the like. As discussed above, the information of the scanable indicia 20 may include a web address, information regarding the authenticity and/or origin of the gemstone 12 or related item that the gemstone 12 is attached to, or the like. In embodiments, the information may include a blockchain used for identifying or authenticating the gemstone 12 or related item.

The controller 50 may authenticate the gemstone 12 by determining one or both of the following: whether the gemstone 12 is a diamond, and whether the indicia 20 is etched below a surface of the table 16 (FIG. 1). The controller 50 may determine whether the gemstone 12 (or other scanned material) is a diamond via signals from the diamond sensor 84. In the embodiments that the diamond sensor 84 is a heated probe, the heated probe may operate as discussed above, where the diamond sensor 84 may detect a heat loss rate of the probe touching the item or gemstone 12, determine a thermal conductivity of the gemstone 12 based on the heat loss rate, and send a signal to the controller 50 indicative of the heat loss rate and/or thermal conductivity. The controller 50 may determine whether the heat loss rate and/or thermal conductivity is within a predetermined range of values and, if the detected heat loss rate and/or thermal conductivity is within the predetermined range of values, the controller 50 may determine whether the scanned item is a diamond. In embodiments that the gemstone 12 is a diamond, the predetermined range of values for thermal conductivity is 24-25 W/cm*K (Watts per centimeter Kelvin).

In embodiments where the diamond sensor 84 includes a scanner or camera, the scanner may detect a fluorescence of the scanned item while one of the light sources 82, 83 emits light at the predetermined frequency. In the instance of a gemstone 12 being scanned, the scanner detects the fluorescence of the gemstone 12 and sends a signal to the controller 50 indicative of the fluorescence, where the controller 50 may determine whether the fluorescence is within a range of predetermined values. If the controller 50 determines the detected fluorescence is within the predetermined range of values, the controller 50 may determine that the gemstone 12 is a diamond.

The controller 50 may additionally determine whether the indicia 20 is formed below the table 16 (FIG. 1) via the scanner 80, the light source 82, and/or the second light source 83. The scanner 80 may detect whether the indicia 20 is formed on the surface of the table 16 (FIG. 1) based on reflections of light from one of the light sources 82, 83 reflecting off the table 16. The controller 50 may determine that the indicia 20 is formed on the surface of the table 16 if the scanner 80 detects a surface roughness above a predetermined threshold value. Alternatively, the controller 50 may determine that the indicia 20 is below the table 16 if the scanner 80 detects a surface roughness below the predetermined threshold value. For example, the table 16 may have a surface roughness of about 20 Angstroms, having a low energy scatter of light reflected off the table 16 (FIG. 1). When formed on the surface of the table 16 (FIG. 1), the indicia 20 may create a roughness on the table 16 greater than the surface roughness of the rest of the table 16 (FIG. 1). The scanner 80 may detect this increase in surface roughness at the indicia 20, and send relative signals to the controller 50 indicative of whether the indicia 20 is formed on the table 16 or subsurface to the table 16 (FIG. 1), where the controller 50 then determines that the indicia 20 is formed on the table 16 (FIG. 1). The scanner 80 may detect the surface roughness of the table 16 based on light reflected off of the table 16 by one of the light sources 82, 83. As shown in FIG. 9E, one of the light sources 82, 83, such as the second light source 83, may be angled to emit light at an angle α oblique to the table 16 of the gemstone 12 that reflects off of the table 16 of the gemstone 12 at the angle α and is captured by the scanner 80. The scanner 80 may determine the reflectivity of the table of the gemstone 12 from the light reflecting off of the table 16. As depicted in FIG. 9E, the scanner 80 may be positioned in the cavity 73 opposite the second light source 83 such that the light that reflects off of the table 16 is directed to the scanner 80. However, it is contemplated that the scanner 80 may detect the reflectivity of the table 16 when the scanner 80 is positioned at the apex of the cavity 73.

Referring again the FIG. 9C, if the controller 50 determines that the indicia 20 is on the table 16 (FIG. 1) or that the scanned item is not a diamond, the controller 50 may determine that the scanned item is not authentic, and send a signal to the indicator 78 to indicate that the scanned item is not authentic. Alternatively, if the controller 50 determines that both the indicia 20 is subsurface to the table 16 (FIG. 1), and that the scanned item is a diamond, the controller 50 may determine that the scanned item is authentic, and send a signal to the indicator 78 to indicate that the scanned item is authentic. In embodiments, the indicator 78 may flash a green light if the item is authentic, and may flash a red light if the item is not authentic. It is further contemplated and possible that the indicator 78 may additionally or alternatively include a display that conveys the authenticity of the item using words, or a speaker that conveys the authenticity of the item using sound.

Figure 9D:
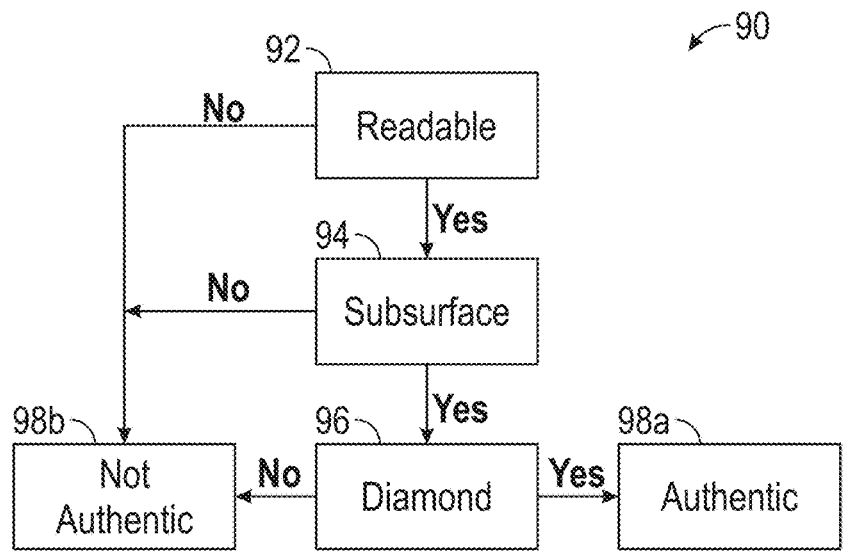
FIG. 9D depicts a flowchart of authenticating a scanned item using the scanning device of FIG. 9A, according to one or more embodiments shown and described herein.
Figure 9E:
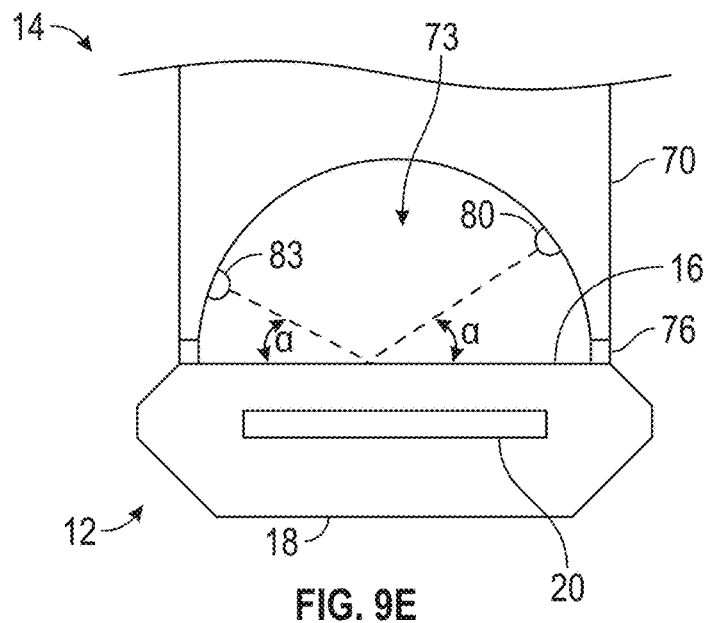
FIG. 9E schematically depicts the scanning device of FIG. 9B scanning the table of the gemstone, according to one or more embodiments shown and described herein.

The authentication of the scanned item may be performed in a series of steps, such as the flowchart depicted in FIG. 9D. Referring to FIG. 9D, a flowchart of a method 90 for authenticating an item is depicted. It is contemplated that the steps of the method 90 may be performed in any order. With reference to FIGS. 9C and 9D, the controller 50 may determine whether a scanned item is authentic by determining whether the indicia 20 is formed within a diamond. At step 92, the method 90 includes determining whether the indicia 20 is readable. This may be performed by illuminating the indicia 20 with the light source 82 and scanning the indicia 20 with the scanner 80. If the indicia 20 is readable, the method 90 proceeds to step 94. At step 94, the method 90 includes determining whether the indicia 20 is below a surface, for example, below the table 16 of the gemstone 12. If the indicia 20 is below the table 16 of the gemstone 12, the method proceeds to step 96. At step 96, the method 90 includes determining whether the scanned item, or gemstone 12, is a diamond. This may be performed by the diamond sensor 84 discussed above. If the scanned item is determined to be a diamond, the method 90 may proceed to step 98a, where the indicator 78 may indicate that the scanned item is authentic. If any of steps 92, 94, 96 do not proceed to the subsequent step, the method 90 may proceed to step 98b, where the indicator 78 may indicate that the scanned item is not authentic.

Referring again to FIG. 9C, the controller 50 may be communicatively coupled to an external device, such as, for example, a server, an internet of things, or the like, to send/receive signals related to the scanable indicia 20. For example, in embodiments where the scanable indicia 20 includes information related to a web address, the controller 50 may communicative with an internet of things to load the web address. The controller 50 may be communicatively coupled to the indicator 78 to be able to send signals to the indicator 78 indicative of the information of the scanable indicia 20 received by the scanner 80. When the indicator 78 receives the signal from the controller 50, the indicator 78 may be configured to display the information of the scanable indicia 20. The indicator 78 may be any traditional display for displaying visual information to a user, such as, for example, a screen (e.g., LED, LCD, QLED, etc.). However, it is contemplated and possible that the indicator 78 may be include non-visual displays of information such as a speaker, a tactile feedback device, or the like.

In another embodiment, the controller 50 may be configured to operate a device for cutting the gemstone 12, such as a laser, an ablation device, or the like. The memory 60 may include instructions that, when executed by the processor 58, cause the cutting device to activate and cut in a desired location or pattern. The cutting patterns may also be saved in the memory 60. Upon activation, the controller 50 may cause a robotic arm, laser light source, ablation device, or the like to be active to properly place the gemstone 12 and make the proper cuts. The controller 50 may be configured to operate the laser light source to etch the indicia into the gemstone 12.

Figure 10A:
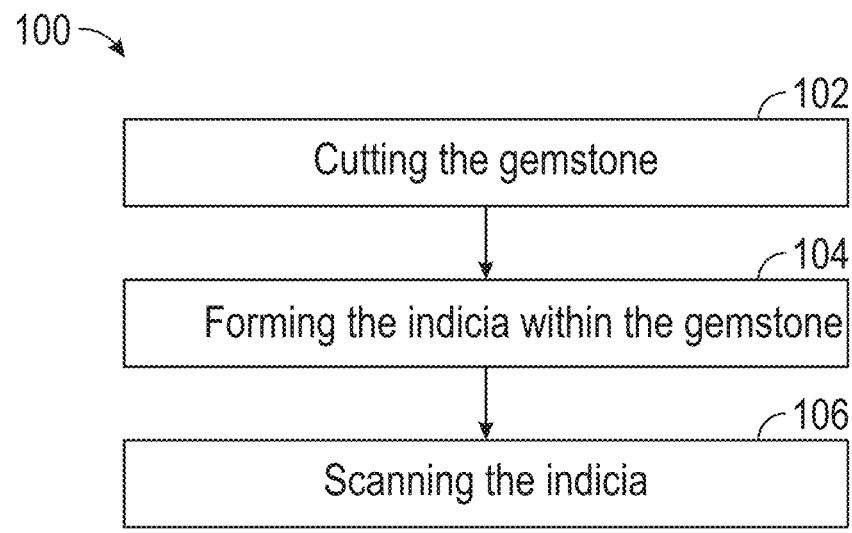
FIG. 10A depicts a flowchart of operation of the scanning device and gemstone of FIG. 6, according to one or more embodiments shown and described herein.

Referring now to FIG. 10A, a flowchart of a method 100 of forming and use of the gemstone 12 is depicted. At step 102, the method may include cutting the gemstone 12 to form the table 16 and the culet 18 extending parallel or substantially parallel to the table 16. This may be done, for example, using the controller as described with reference to FIG. 6. The method 100 may further include cutting additional surfaces into the gemstone 12, such as, for example, the pavilion 36, the girdle 38, and the crown 30. Cutting the surfaces of the gemstone 12 may include cutting the plurality of facets 32 in the crown 30. The method 100 may further include surface treating one or both of the culet 18 and the pavilion 36 with the surface treatment described above to increase visibility of the indicia 20.

At step 104, the method 100 may include forming the scanable indicia 20 into the gemstone 12. Forming the scanable indicia 20 may include forming the indicia 20 at least partially positioned within the orthographic projection 22 of the area A extending along the axis X, and may include laser treating the gemstone 12 to form the scanable indicia 20 below a surface 28 of the table 16 between the table 16 and the culet 18. The laser treatment includes aligning two lasers to a position in the gemstone 12 that, individually, cannot form a marking and, when the two lasers meet at the position in the gemstone 12, turn the carbon atoms in the gemstone 12 to graphene, causing the location to appear darker than the rest of the gemstone 12. However, it is contemplated and possible that the scanable indicia 20 may be formed in the gemstone 12 in any known manner, such as, for example, alternative laser methods or chemical etching.

At step 106, the method 100 may include scanning the scanable indicia 20 with the scanning device 14. Scanning the scanable indicia 20 may include aligning the scanner 80 of the scanning device 14 along the axis X of the gemstone 12 to scan the indicia 20. At step 108, once the scanable indicia 20 is scanned, the method 100 may include receiving information related to the scanable indicia 20, and displaying the information related to the scanable indicia 20.

In embodiments, the method 100 may include bruting at least one of the culet 18 and the pavilion 36 by grinding the culet 18 and pavilion 36 with a diamond grit sandpaper. In some embodiments, the method 100 may include painting the gemstone 12 below the girdle 38, such as the pavilion 36 and the culet 18, with a white diffuse paint, as discussed above. The method 100 may include polishing surfaces of the gemstone 12, including at least one of the table 16 and the crown 30.

Figure 10B:
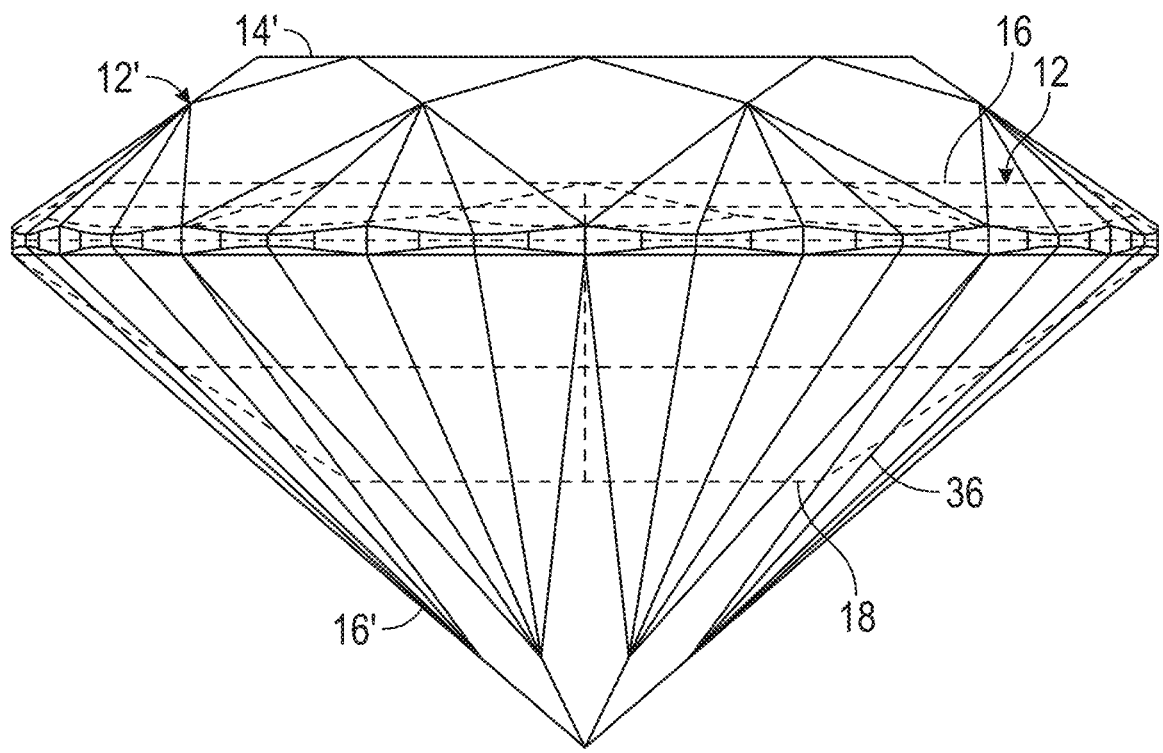
FIG. 10B schematically depicts a round, brilliant cut diamond overlayed with the gemstone of FIG. 1, according to one or more embodiments shown and described herein.

Referring to FIGS. 10A and 10B, the method 100 may include forming the gemstone 12 by cutting a round, brilliant cut diamond (RBC) 12'. A top portion 14' of the RBC 12' may be cut off to increase a size of the table 16 of the gemstone 12, where the top portion 14' may be repurposed to be used as, for example, another gemstone. The crown 34 and the girdle 38 may remain for the gemstone 12 without any additional cuts. A bottom portion 16' of the RBC 12' may additionally be cut off to increase a size of the culet 18, where the bottom portion 16' may be repurposed to be used as, for example, another gemstone. The pavilion 36 of the RBC 12' may be left alone, with facets, or may be smoothed down to remove the facets on the pavilion 36. When cutting the top portion 14' or the bottom portion 16' of the RBC 12' more or less of the top portion 14' and the bottom portion 16' may be taken off of the RBC 12' to increase or decrease a size of the table 16 and the culet 18, respectively.

In some embodiments, an uncut RBC 12' may be used as the gemstone 12, where the indicia 20 is formed in the RBC 12'. An uncut RBC 12' has a smaller area of the table 16, and may not include a culet 18, such that the size of the indicia 20 must be decreased. To decrease a size of the indicia 20, a micro QR code may be used. The uncut RBC 12' may include the paint or surface treatment discussed above on the pavilion of the RBC 12' to increase visibility of the indicia 20.

Figure 11:
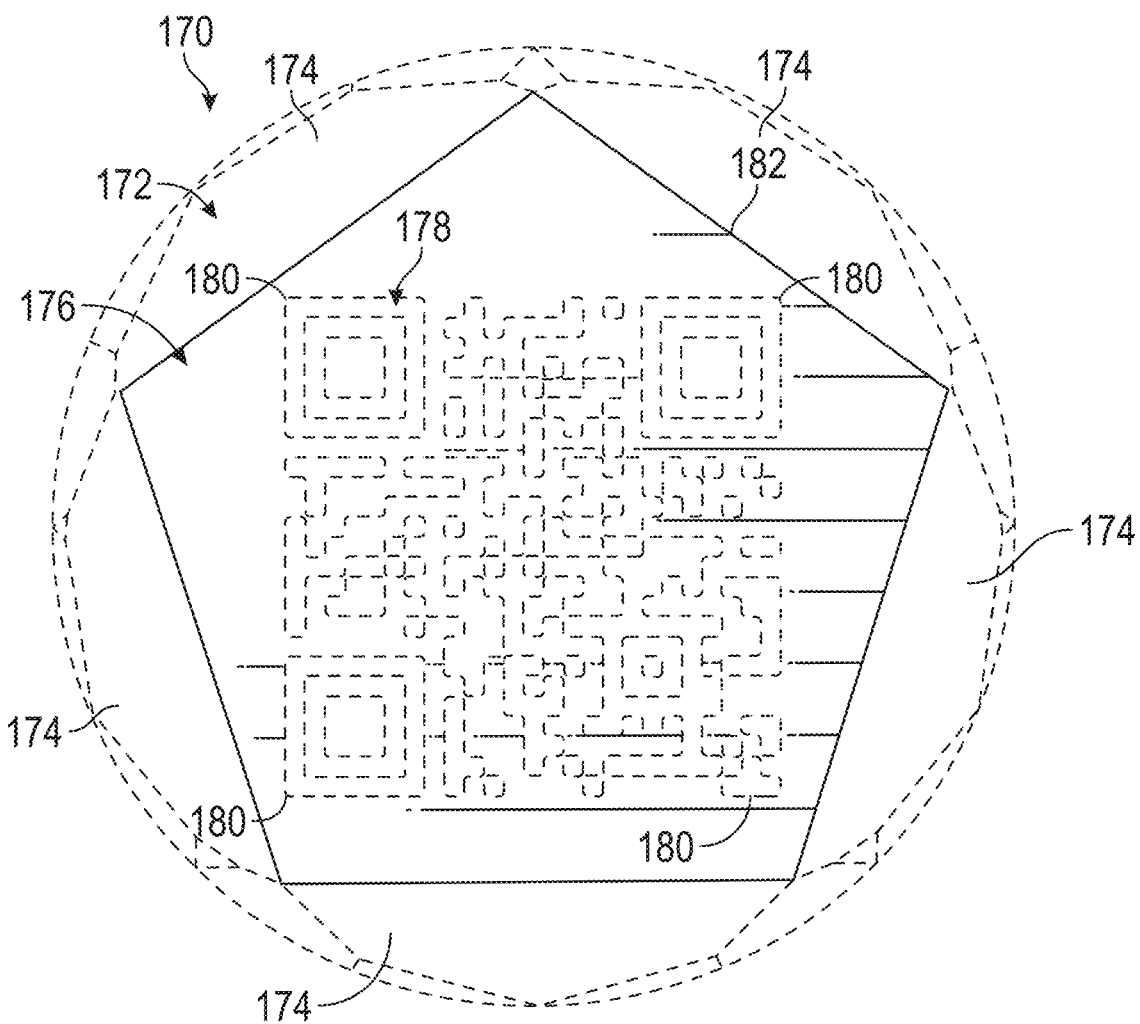
FIG. 11 depicts a top view of another gemstone with a table shaped as a pentagon, according to one or more embodiments shown and described herein.
Figure 12B:
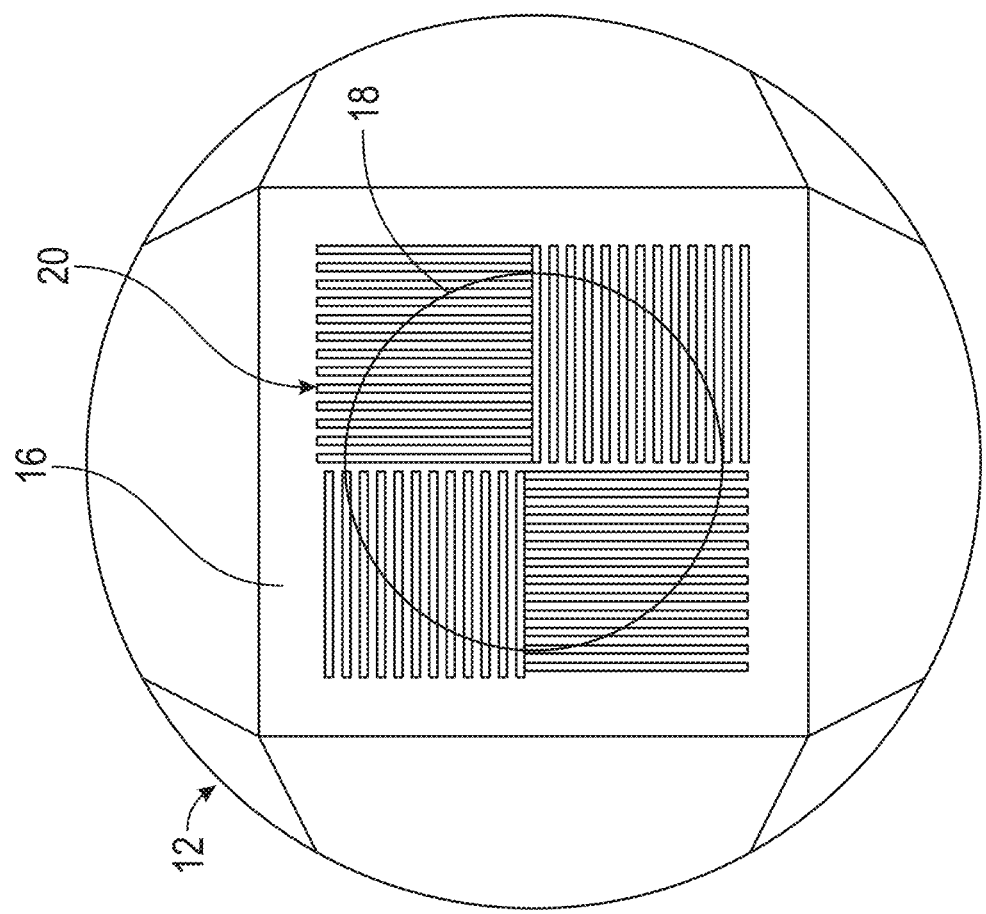
FIGS. 12A and 12B depict side and front views of the gemstone of FIG. 1 having a thickness of 1.2 mm, according to one or more embodiments shown and described herein.
Figure 12A:
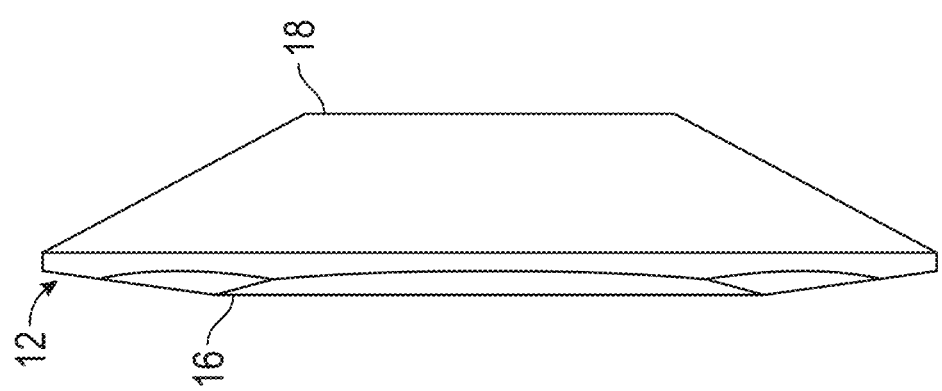
Figure 13B:
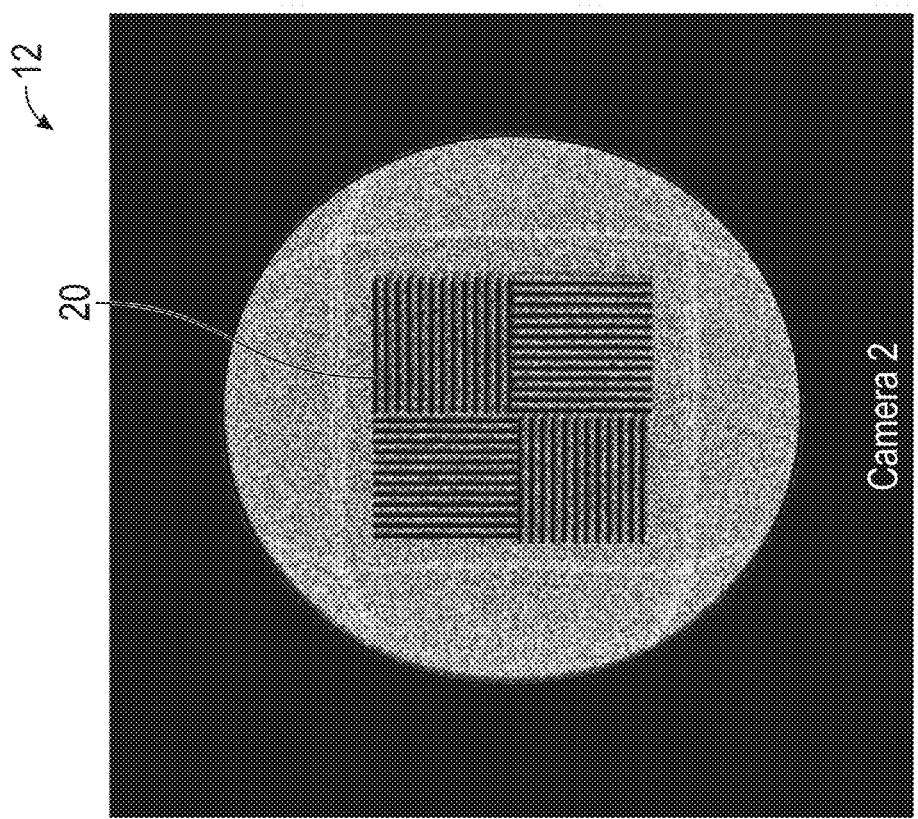
FIGS. 13A and 13B depict the gemstone of FIG. 12A under a light source simulating the Sun and having a surface treatment that is white, according to one or more embodiments shown and described herein.
Figure 13A:
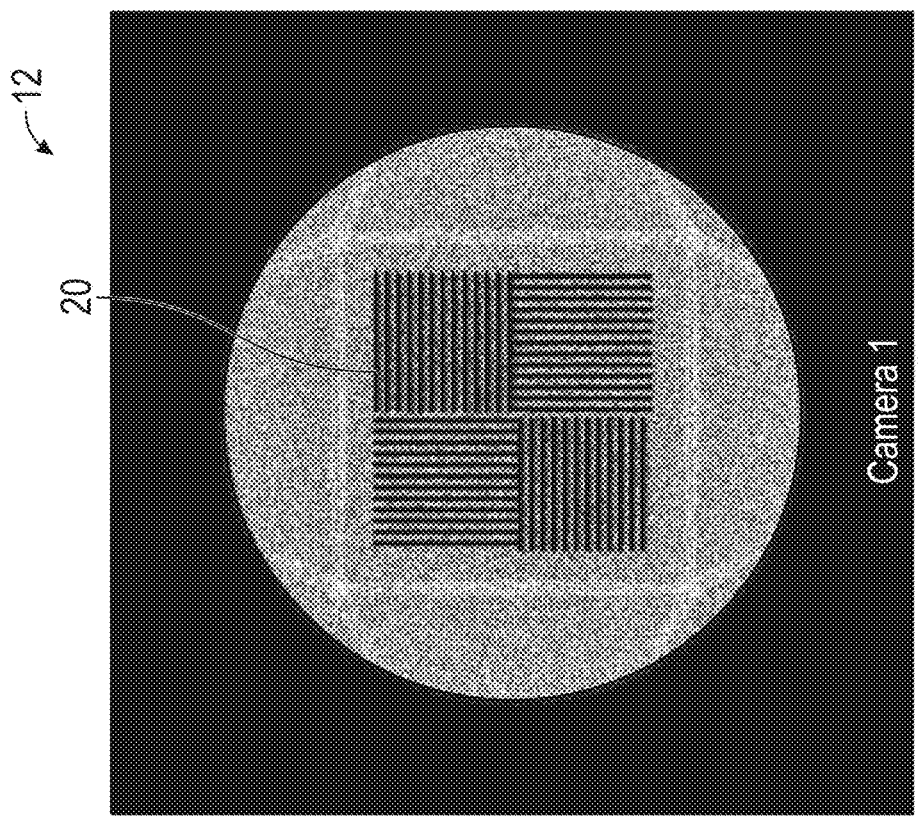
Figure 14B:
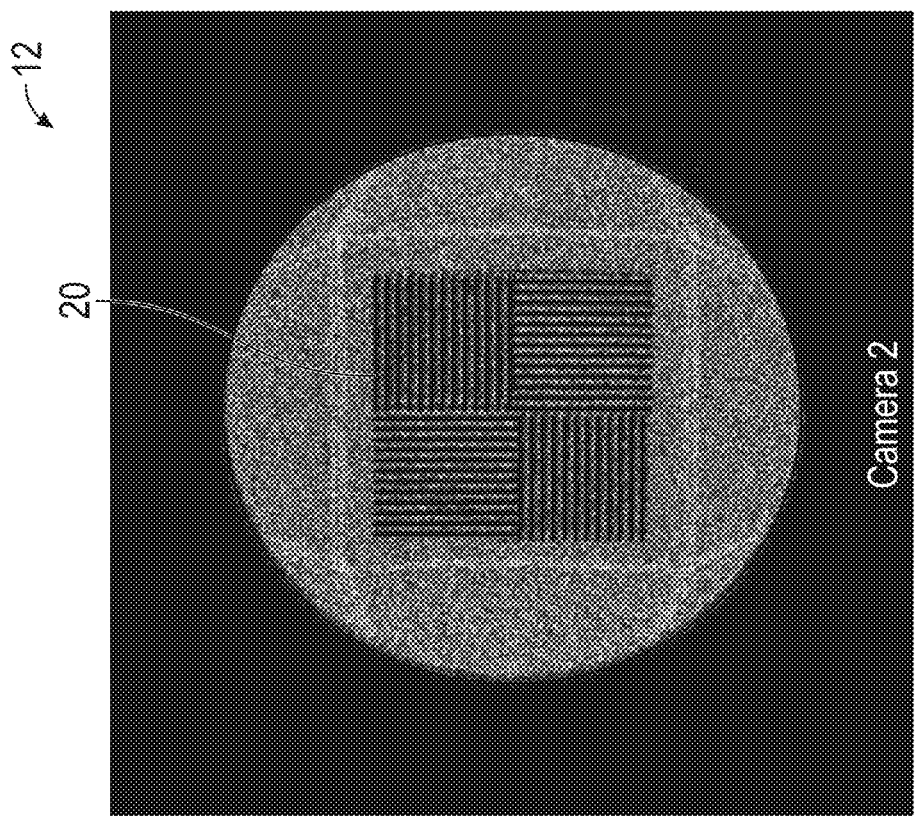
FIGS. 14A and 14B depict the gemstone of FIG. 12A under a light source simulating the Sun and having a surface treatment that is gray, according to one or more embodiments shown and described herein.
Figure 14A:
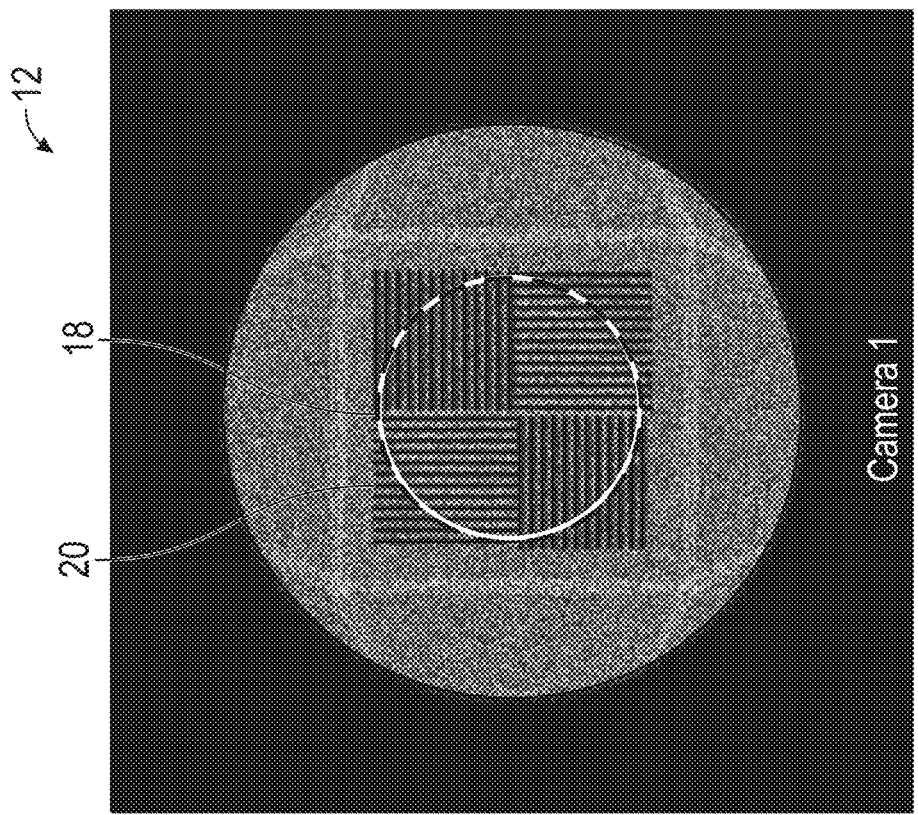

Referring now to FIG. 11, another gemstone 170 is depicted. The gemstone 170 is similar to the gemstone 12 described above, with exception to the details described below. For brevity, like features will not be described again. The gemstone 170 may include a crown 172 that includes five facets 174 such that a table 176 is shaped as a pentagon. A scanable indicia 178 may include a plurality of corners 180, such as four corners, that contact or are adjacent to a periphery 182 of the table 176. The periphery 182 of the table 176 may surround and frame the scanable indicia 178. The periphery 182 may be a plurality of edges where the table 176 intersects the crown 172 to define a profile of the table 176. In embodiments where the table 176 includes more or less facets 174, the corners 180 of the indicia 178 may similarly contact a periphery of the table 176.

Referring now to FIGS. 12A-31B, the readability of the indicia 20 of the gemstone 12 described above is affected by numerous factors, including, but not limited to, the contrast between the indicia 20 and the surroundings, reflectance or glare from light sources on the table 16 or other surfaces of the gemstone 12, and light from the background of the indicia 20, where the background may include the culet 18 or objects and surfaces behind indicia 20 past the culet 18. The reflectance, contrast, and resultant visibility of the indicia 20 is shown in FIGS. 13A-21B and 23A-31B, where the visibility of the indicia 20 was tested based on a variety of surface treatments using a pair of cameras and at least one light source. In the examples, the cameras are aimed at the table 16 and angled 20° relative to one another, with one of the cameras angled perpendicular to the table 16 of the gemstone 12. The light source is aimed at the table 16 and angled in a range of 5-20° relative to both cameras. The light source is varied in FIGS. 13A-21B and 23A-31B, and includes one of a simulated Sun source, a lamp source, and an ambient source. In FIGS. 13A-16B including the Sun source, the light source has a 0.5 degree full angle divergence. In 17A-20B including the lamp source, the light source has a 10 degree full angle divergence. In FIGS. 21A and 21B including the ambient source, the light source has 150 degree full angle divergence. The angle of divergence is an angle range of the light originating from the light source.

In FIGS. 12A-21B, the gemstone 12 is depicted having a center thickness of 1.2 mm, where the thickness is a distance between the table 16 and the culet 18, and the diameter of the culet 18 is equal to a length of a side of the indicia 20. In FIGS. 13A-16B, the light source is the Sun source, where FIGS. 13A, 14A, 15A, and 16A are images from the camera angled perpendicular to the table 16, and FIGS. 13B, 14B, 15B, and 16B are images from the camera angled relative to the other camera. As shown in FIGS. 13A and 13B, the surface treatment provided on the culet 18 and pavilion 36 (FIG. 1) has a color that is perfect white, having a 100% Lambertian reflectance scatter model that suppresses specular reflections on the gemstone 12 so that the indicia 20 is visible with high contrast compared to other colored surface treatments, and the culet 18 is not visible. As shown in FIGS. 14A and 14B, the surface treatment provided on the culet 18 and pavilion 36 (FIG. 1) has a color that is perfect gray, having a 50% Lambertian reflectance scatter model that suppresses specular reflections on the gemstone 12 so that the indicia 20 is visible with lower contrast than the perfect white surface treatment, where the culet 18 is visible through the indicia 20.

Figure 15B:
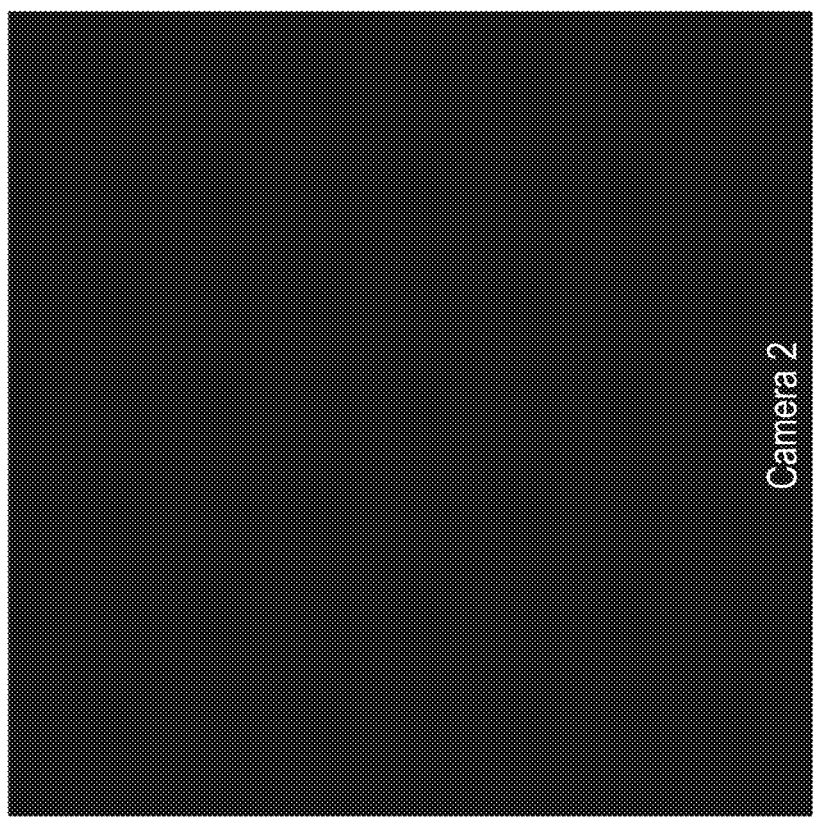
FIGS. 15A and 15B depict the gemstone of FIG. 12A under a light source simulating the Sun and having a surface treatment that is black, according to one or more embodiments shown and described herein.
Figure 15A:
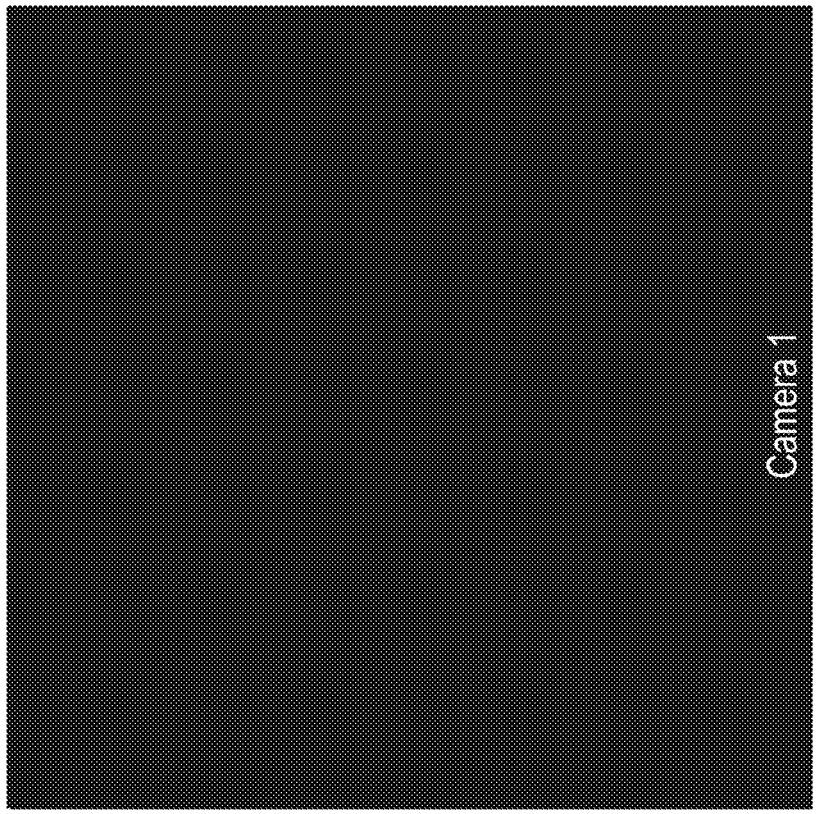
Figure 16B:
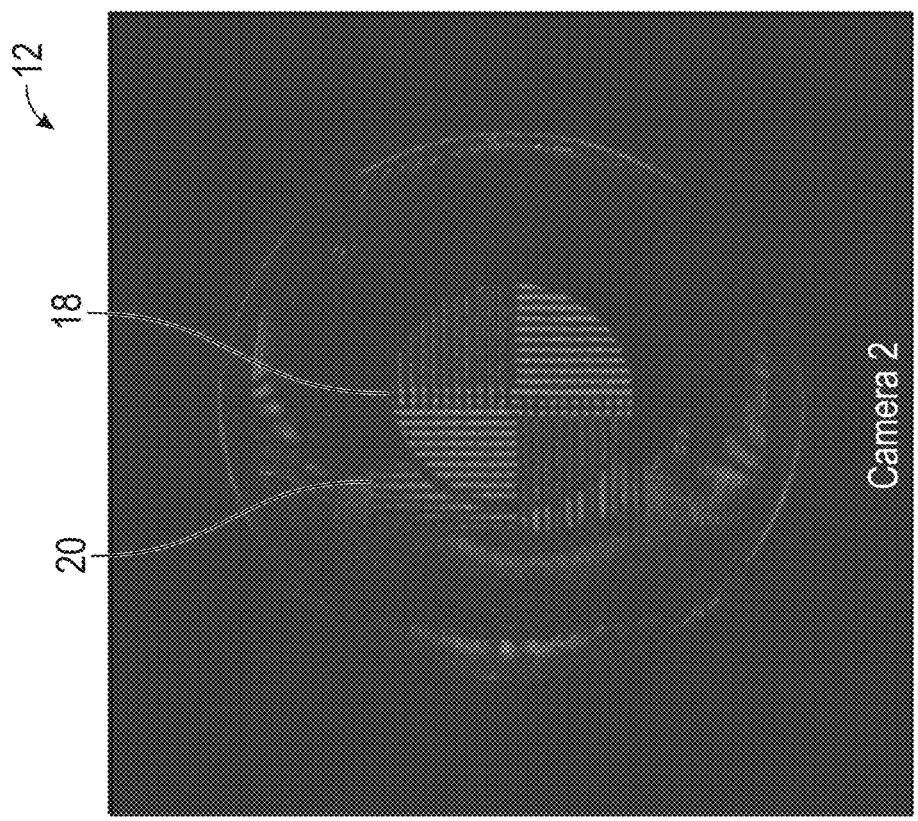
FIGS. 16A and 16B depict the gemstone of FIG. 12A under a light source simulating the Sun and being uncoated, according to one or more embodiments shown and described herein.
Figure 16A:
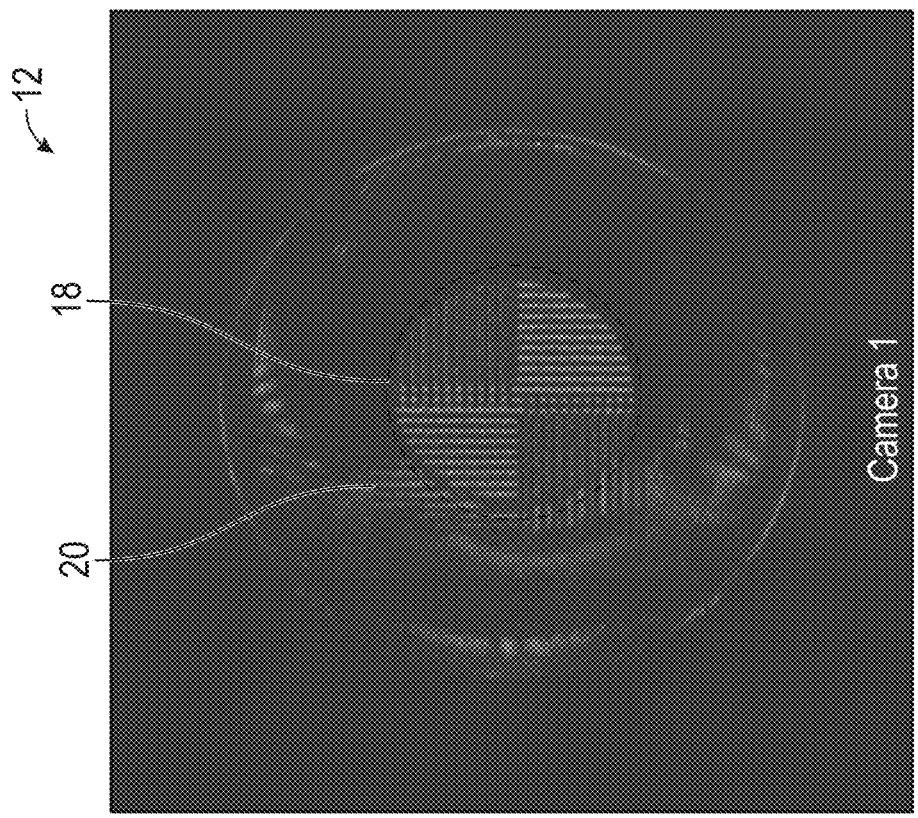

As shown in FIGS. 15A and 15B, the surface treatment provided on the culet 18 and pavilion 36 has a color that is perfect black, having perfectly absorbing surfaces that suppress specular reflections on the gemstone 12 and allow only glare reflections on the table 16 to be visible. As shown in FIGS. 16A and 16B, the gemstone 12 is uncoated, where specular glints are visible that interfere with the visibility of the indicia 20. In this embodiment, the visibility of the indicia 20 is severely limited, where the indicia 20 has appropriate contrast in the orthographic projection of the culet 18 area such that the indicia 20 is scanable only in that area.

Figure 17B:
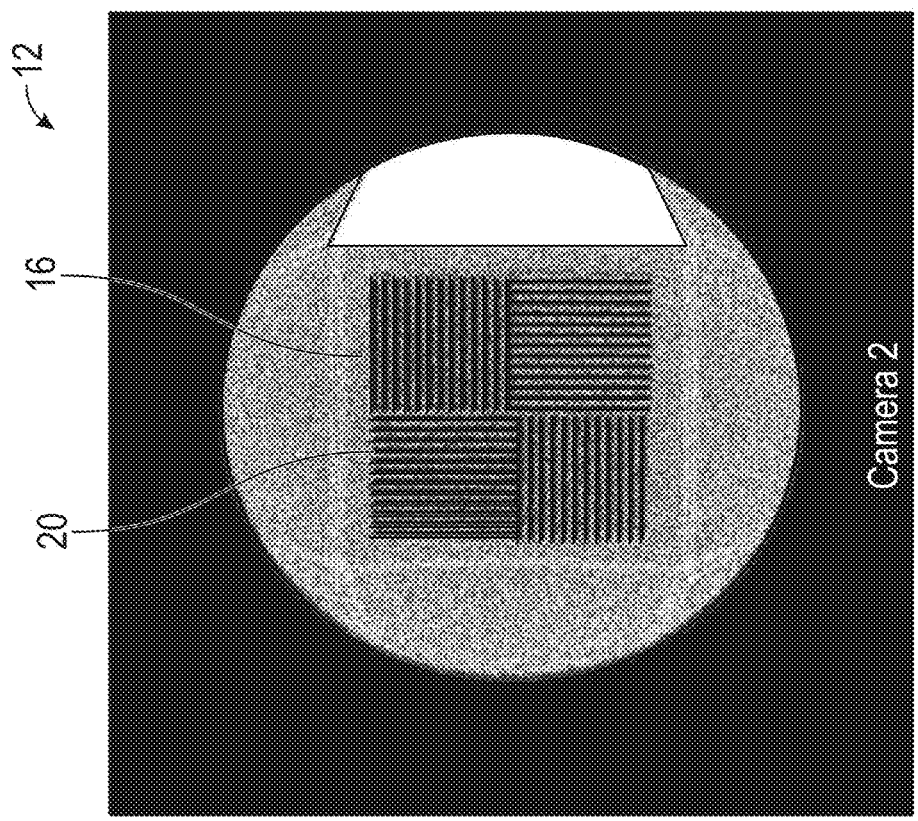
FIGS. 17A and 17B depict the gemstone of FIG. 12A under a light source simulating a lamp and having a surface treatment that is white, according to one or more embodiments shown and described herein.
Figure 17A:
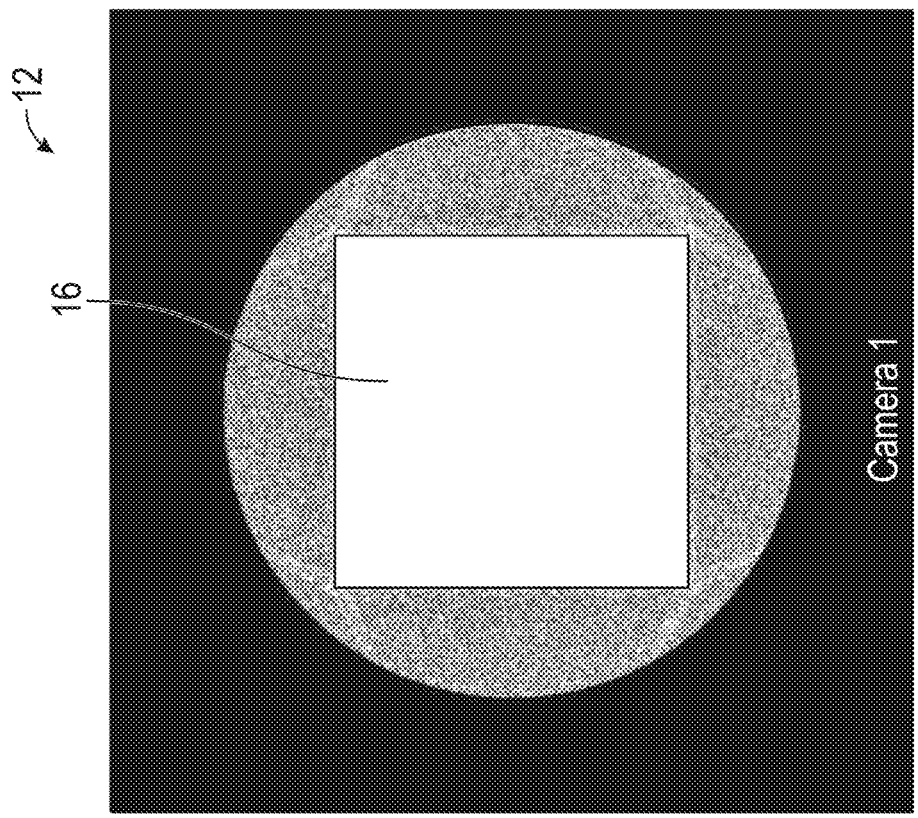
Figure 18B:
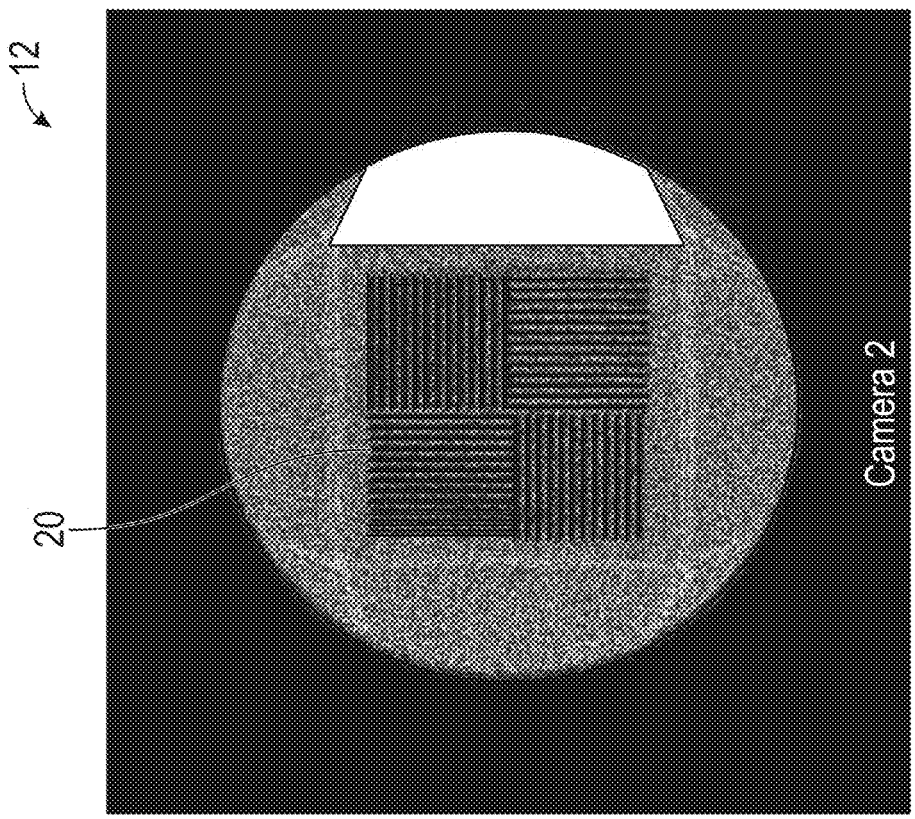
FIGS. 18A and 18B depict the gemstone of FIG. 12A under a light source simulating a lamp and having a surface treatment that is gray, according to one or more embodiments shown and described herein.
Figure 18A:
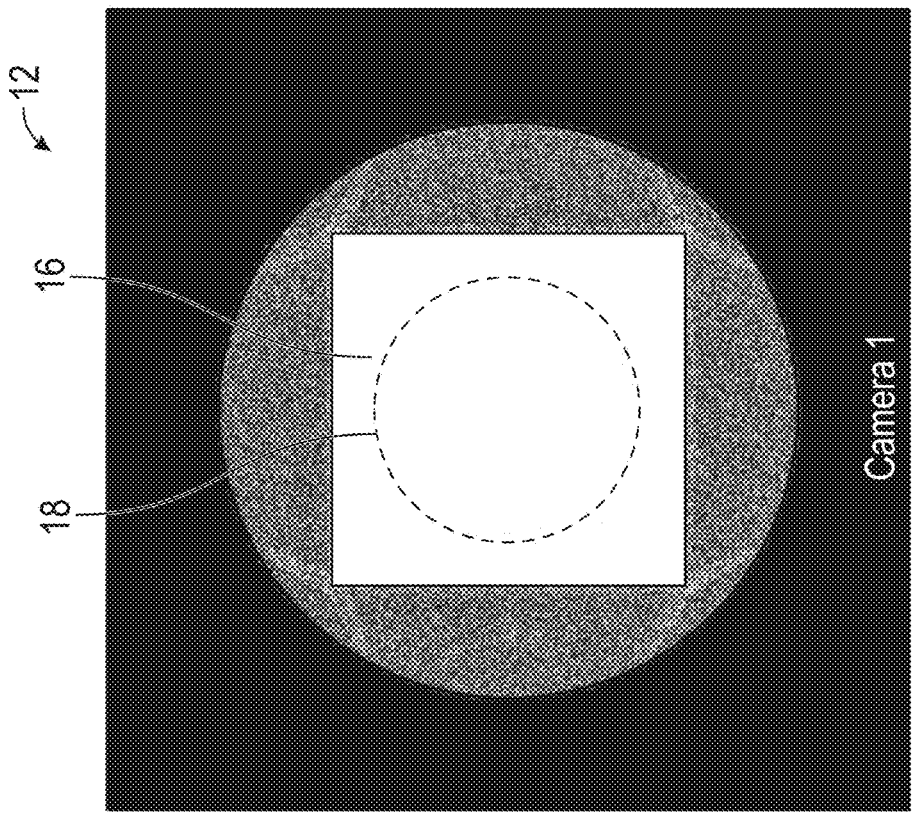
Figure 19B:
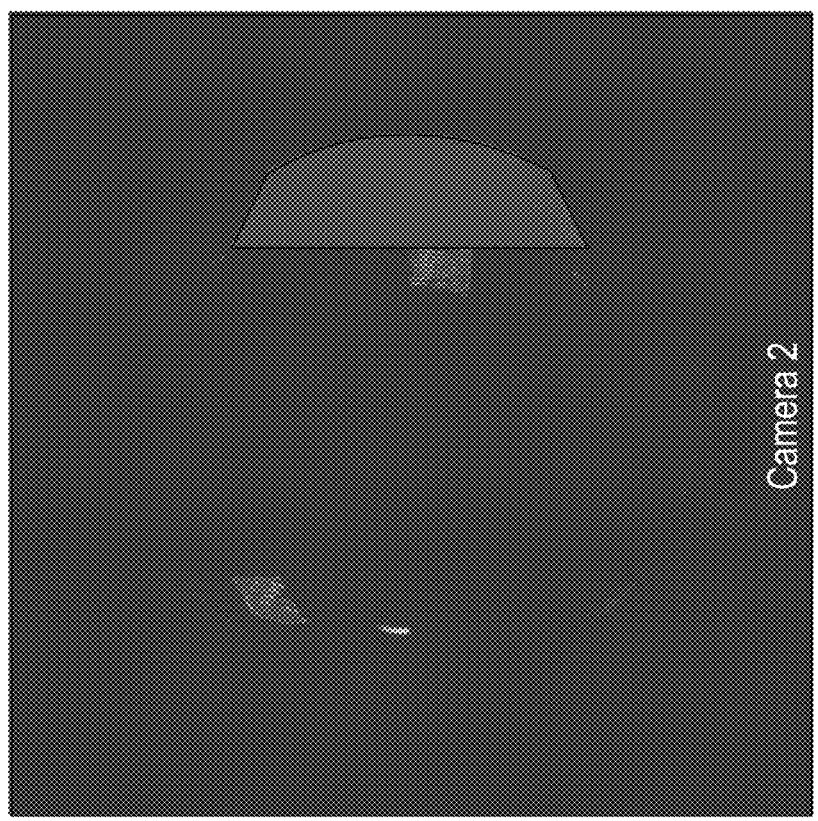
FIGS. 19A and 19B depict the gemstone of FIG. 12A under a light source simulating a lamp and having a surface treatment that is black, according to one or more embodiments shown and described herein.
Figure 19A:
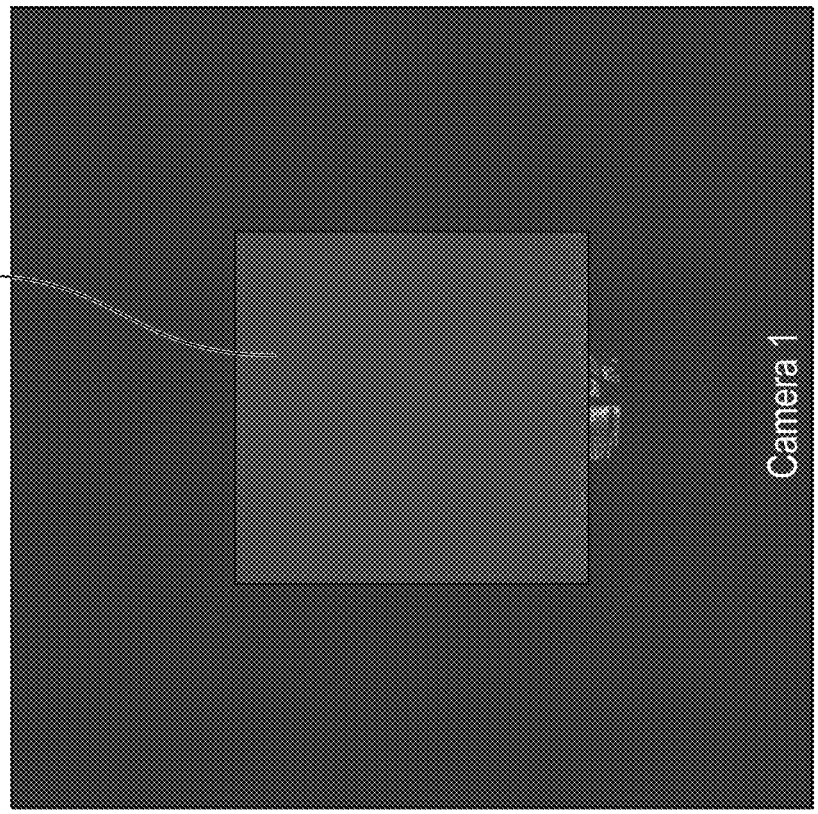
Figure 20B:
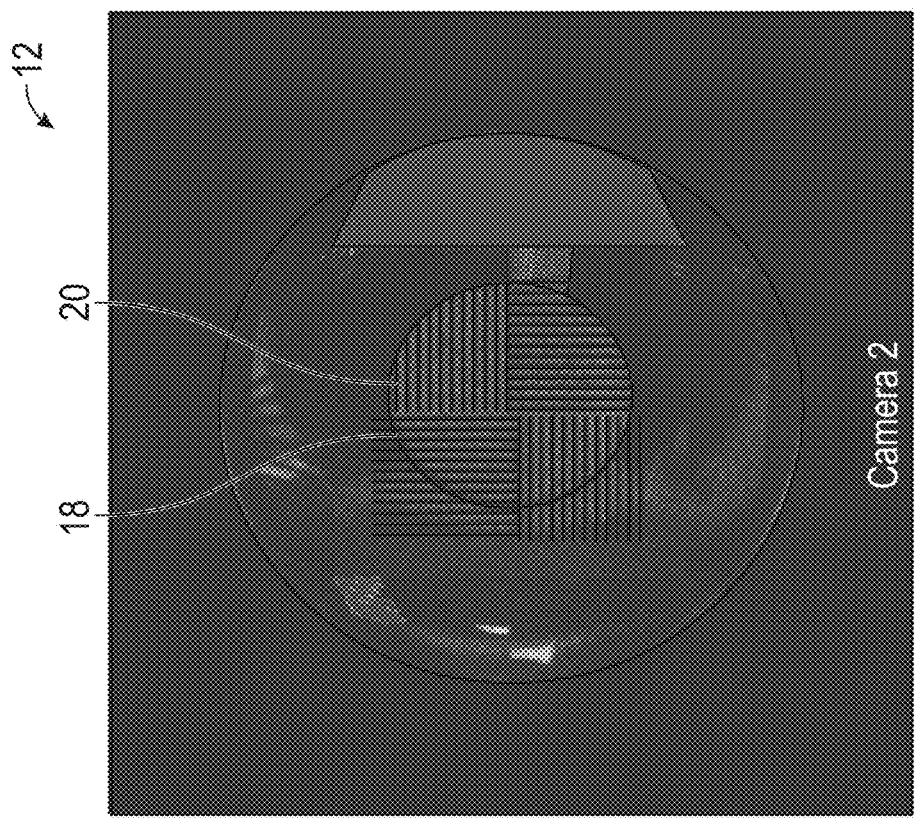
FIGS. 20A and 20B depict the gemstone of FIG. 12A under a light source simulating a lamp and being uncoated, according to one or more embodiments shown and described herein.
Figure 20A:
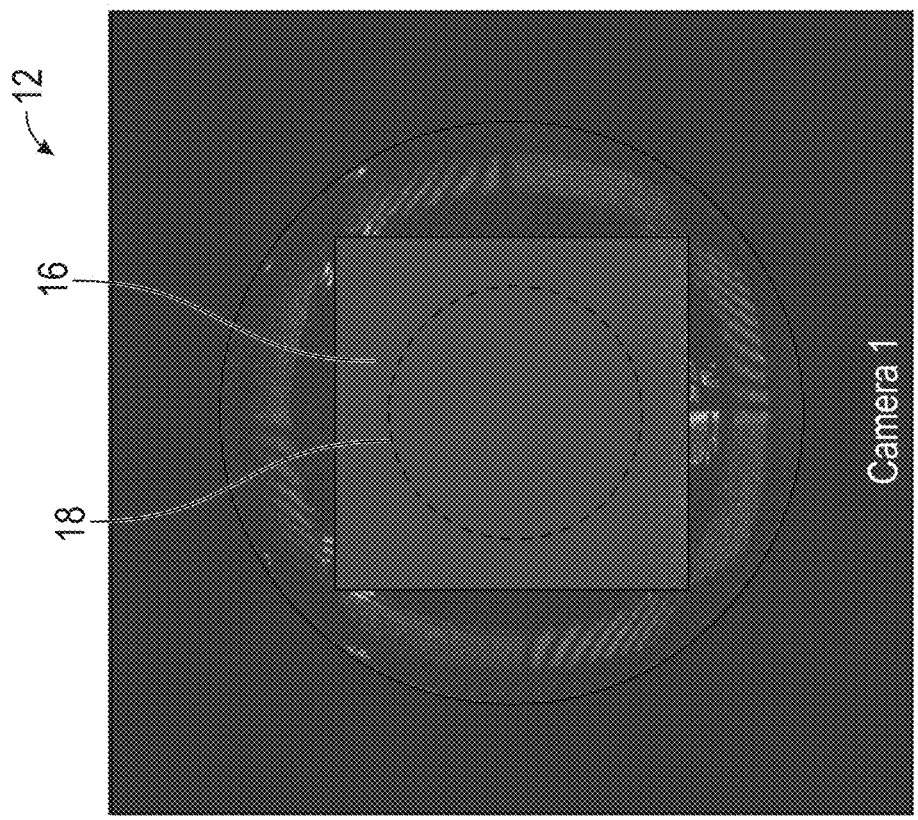
Figure 21B:
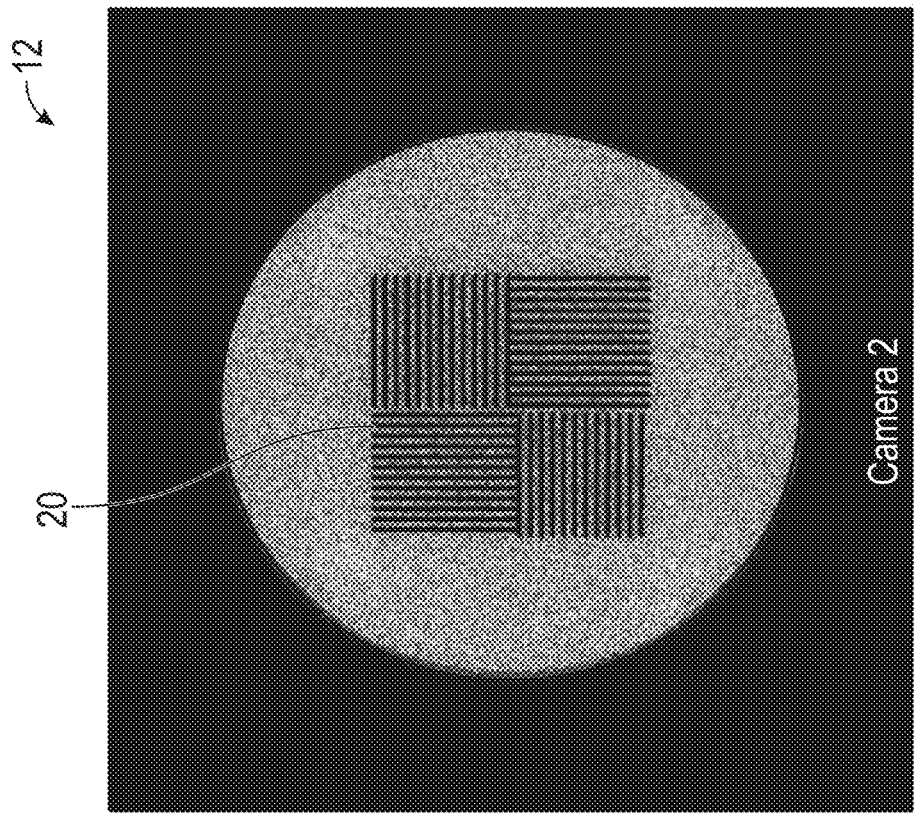
FIGS. 21A and 21B depict the gemstone of FIG. 12A under an ambient light source and having a surface treatment that is white, according to one or more embodiments shown and described herein.
Figure 21A:
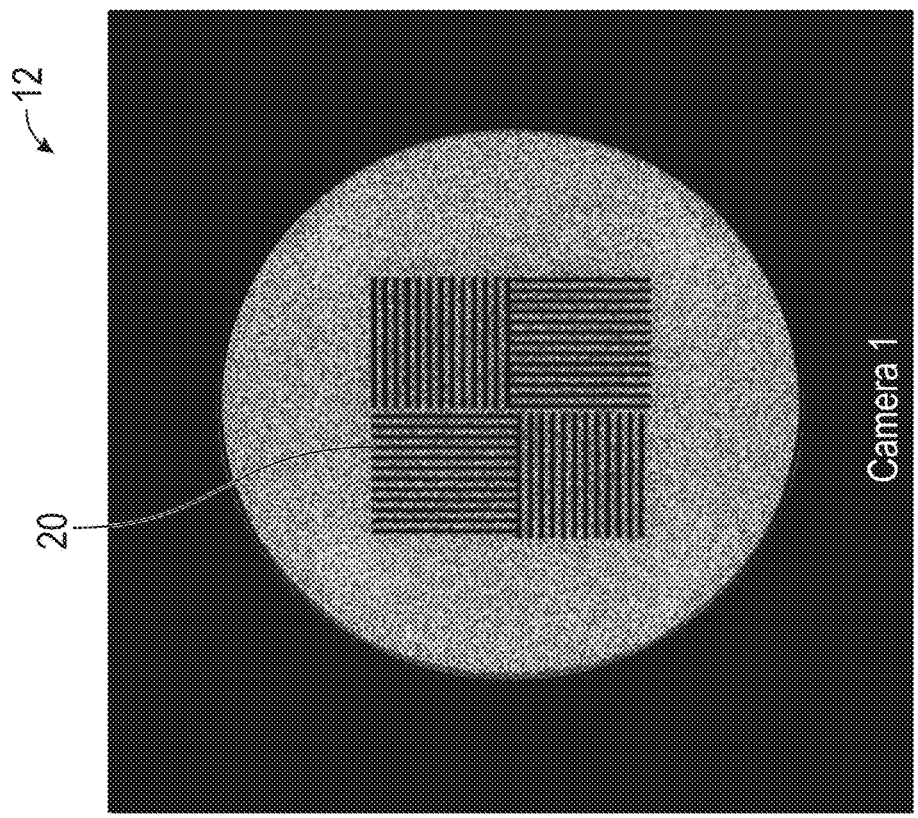
Figure 23B:
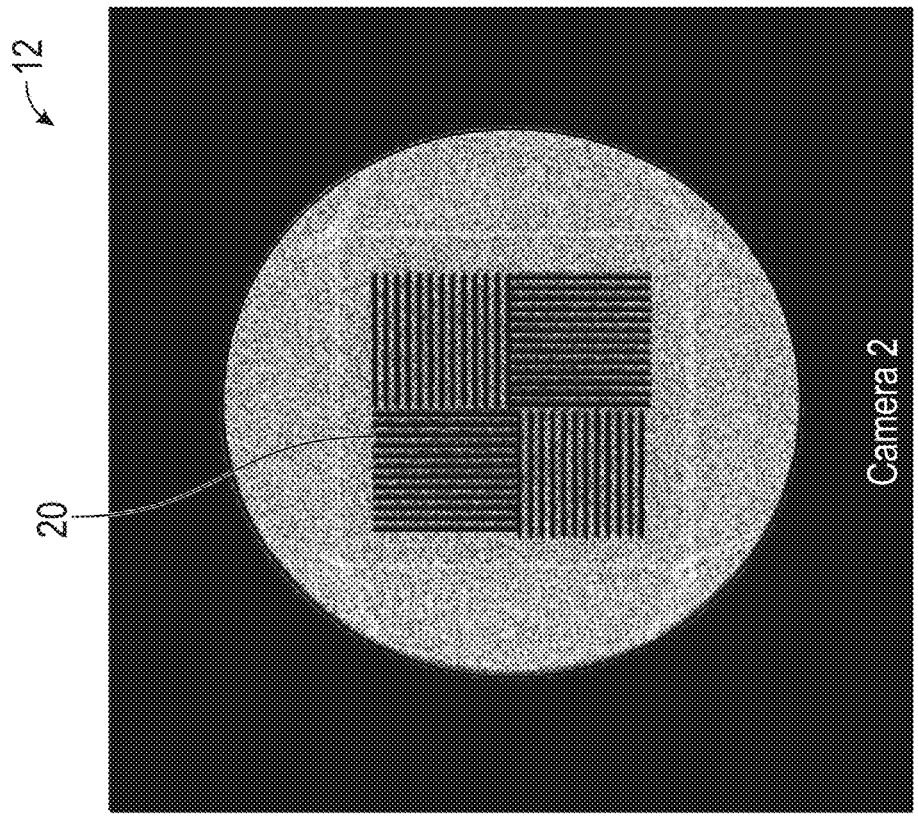
FIGS. 23A and 23B depict the gemstone of FIG. 22A under a light source simulating the Sun and having a surface treatment that is white, according to one or more embodiments shown and described herein.
Figure 23A:
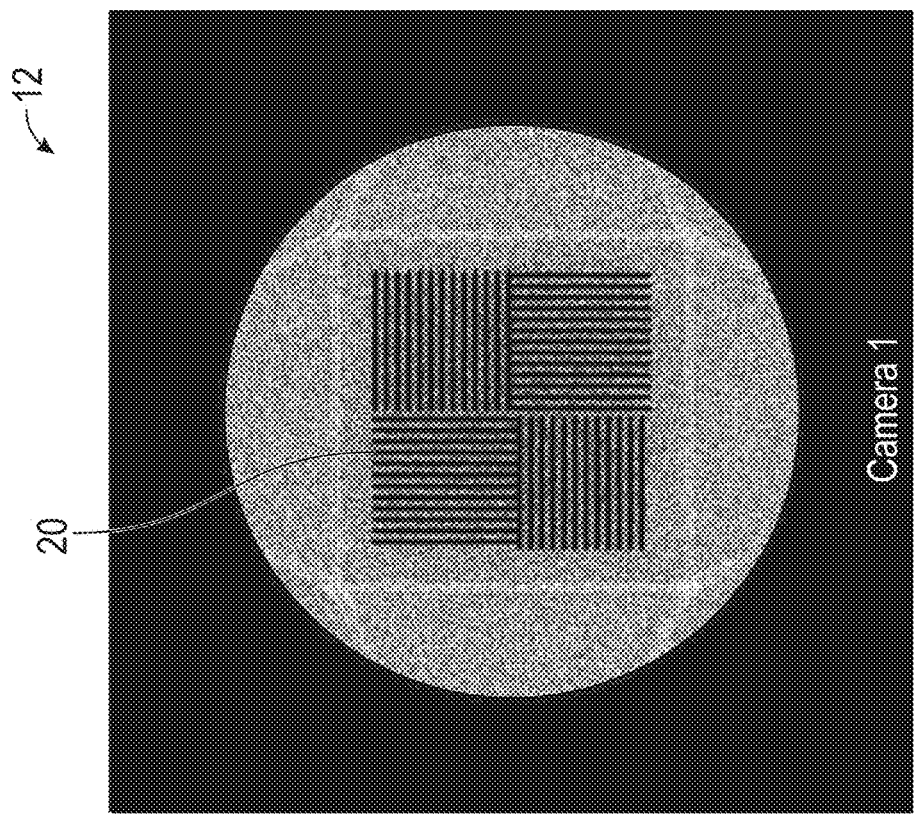
Figure 24B:
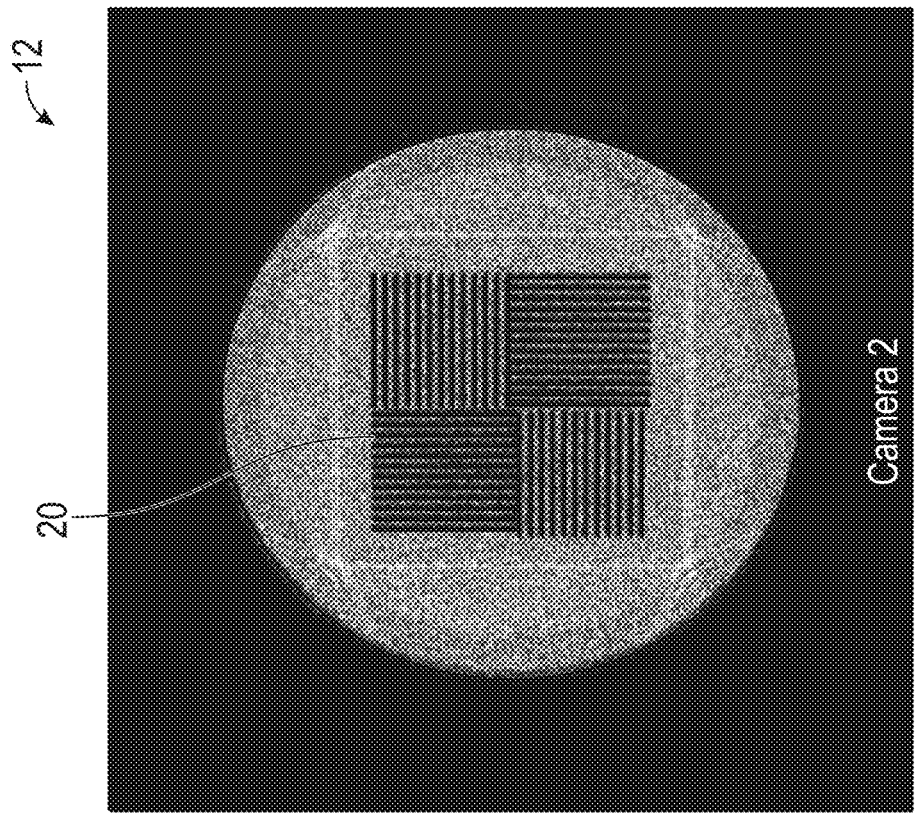
FIGS. 24A and 24B depict the gemstone of FIG. 22A under a light source simulating the Sun and having a surface treatment that is gray, according to one or more embodiments shown and described herein.
Figure 24A:
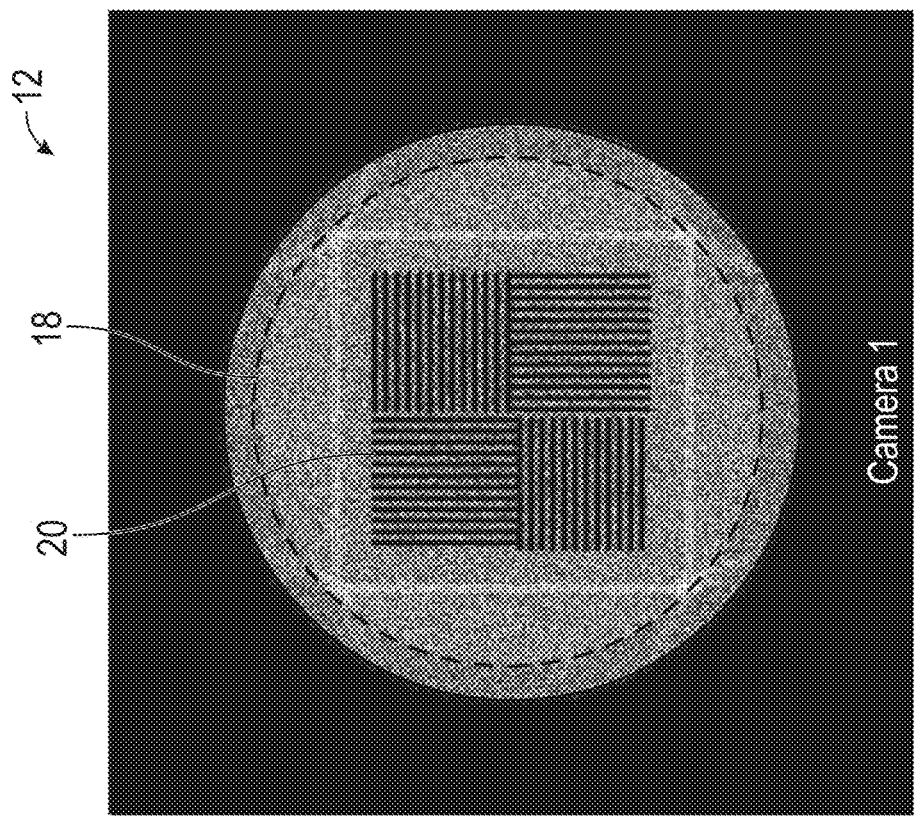

As shown in FIGS. 17A-20B, the light source used is the lamp source, where the increased angle of divergence of the light causes glare on the table 16, limiting the visibility of the indicia 20. These Figures are in a same order as the Figures above, where FIGS. 17A and 17B depict a perfect white surface treatment, FIGS. 18A and 18B depict a perfect gray surface treatment, FIGS. 19A and 19B depict a perfect black surface treatment, and FIGS. 20A and 20B depict an uncoated gemstone 12. Moreover, as shown in FIGS. 17A, 18A, 19A, and 20A, the glare from the light source entirely restricts visibility of the indicia 20 from the camera angled perpendicular to the table 16. Alternatively, as shown in FIGS. 17B, 18B, 19B, and 20B, the camera angled at 20° from the table 16 has a clear image of the indicia 20, where the indicia 20 would be scanable. FIGS. 21A and 21B depict an embodiment with an ambient light source, where the surface treatment is a perfect white. As shown, the ambient light source does not provide any glare on the table 16 or reduce the visibility of the indicia 20. Rather, the ambient light source reduces the visibility of other features on the gemstone 12, such as the facets of the crown.

In FIGS. 22A-31B, the gemstone 12 is depicted having a center thickness of 0.5 mm and the same other dimensions as the gemstone 12 in FIGS. 12A-21B, where the diameter of the culet 18 is greater than a length of a side of the indicia 20 to have an area that circumferentially surrounds the indicia 20 when viewed perpendicularly to the table 16. In FIGS. 23A-26B, the light source is the Sun source, where FIGS. 23A, 24A, 25A, and 26A are images from the camera angled perpendicular to the table 16, and FIGS. 23B, 24B, 25B, and 26B are images from the camera angled relative to the other camera. As shown in FIGS. 23A and 23B, the surface treatment provided on the culet 18 and pavilion 36 has a color that is perfect white, having a 100% Lambertian reflectance scatter model that suppresses specular reflections on the gemstone 12 so that the indicia 20 is visible with high contrast compared to other colored surface treatments, and the culet 18 is not visible. As shown in FIGS. 24A and 24B, the surface treatment provided on the culet 18 and pavilion 36 has a color that is perfect gray, having a 50% Lambertian reflectance scatter model that suppresses specular reflections on the gemstone 12 so that the indicia 20 is visible with lower contrast than the perfect white surface treatment, where the culet 18 is visible through the indicia 20. In this embodiment, as the culet 18 is larger than the indicia 20, the outline of the culet 18 viewed in the cameras does not interfere with the contrast of the indicia 20.

Figure 25B:
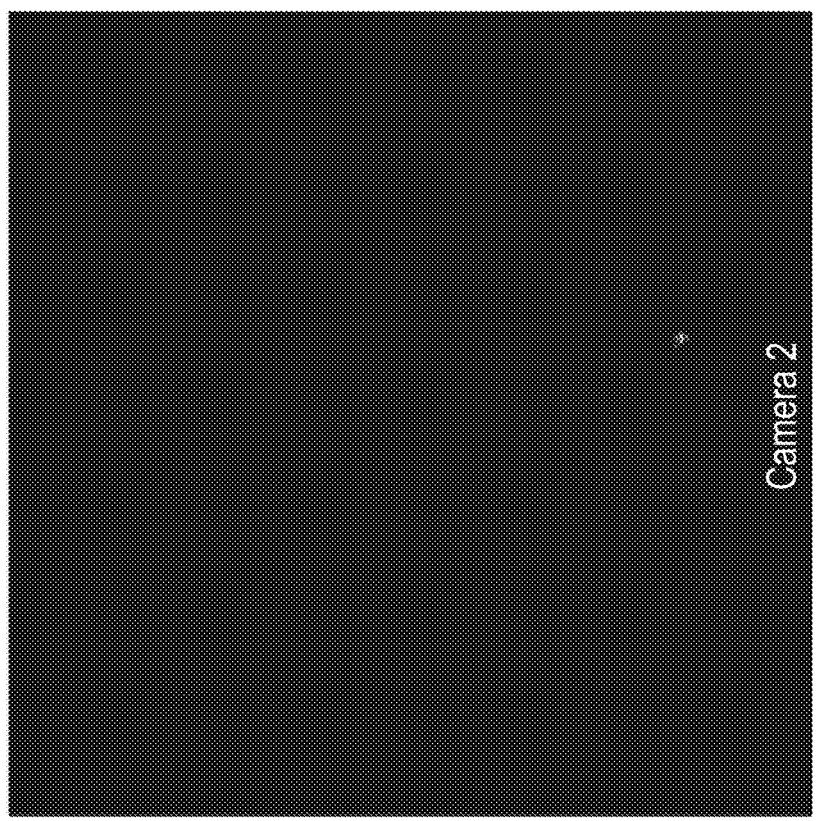
FIGS. 25A and 25B depict the gemstone of FIG. 22A under a light source simulating the Sun and having a surface treatment that is black, according to one or more embodiments shown and described herein.
Figure 25A:
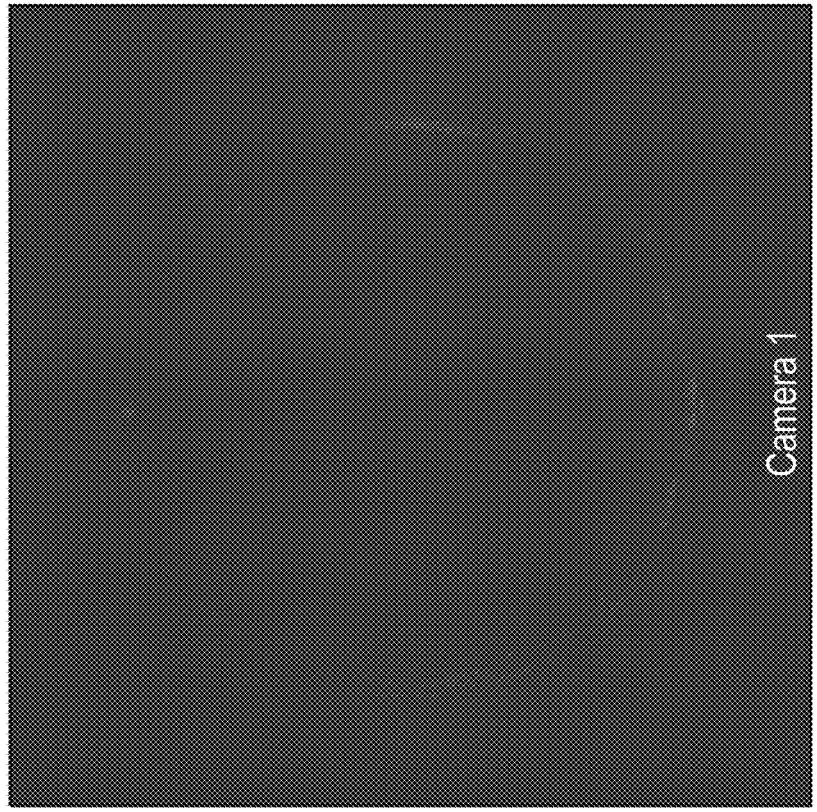
Figure 26B:
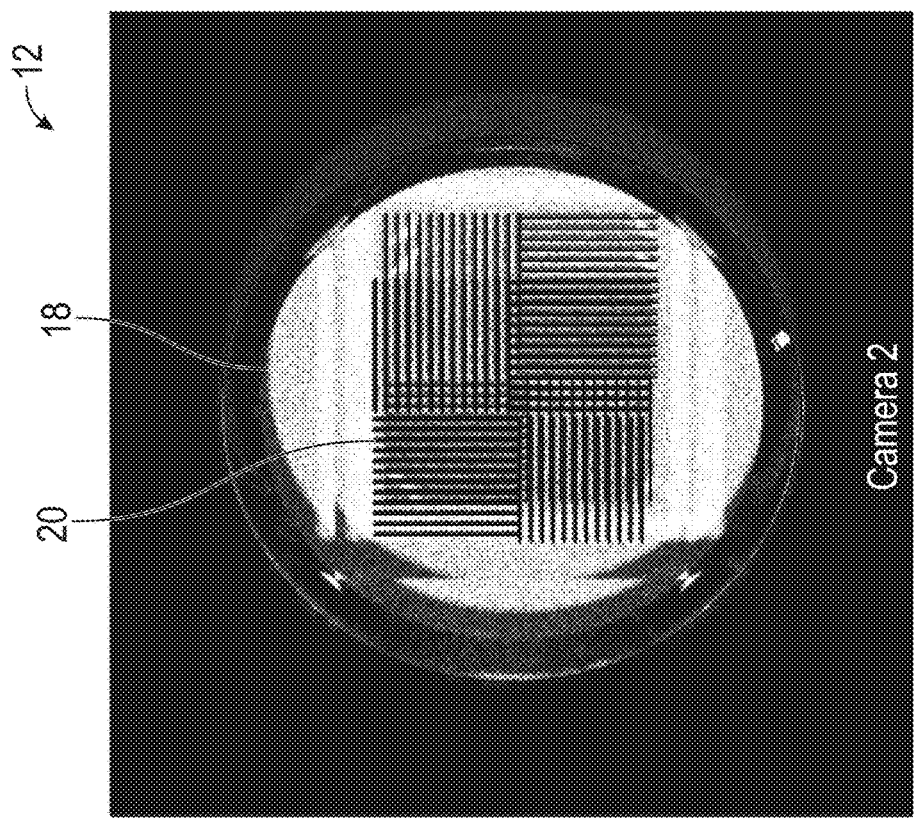
FIGS. 26A and 26B depict the gemstone of FIG. 22A under a light source simulating the Sun and being uncoated, according to one or more embodiments shown and described herein.
Figure 26A:
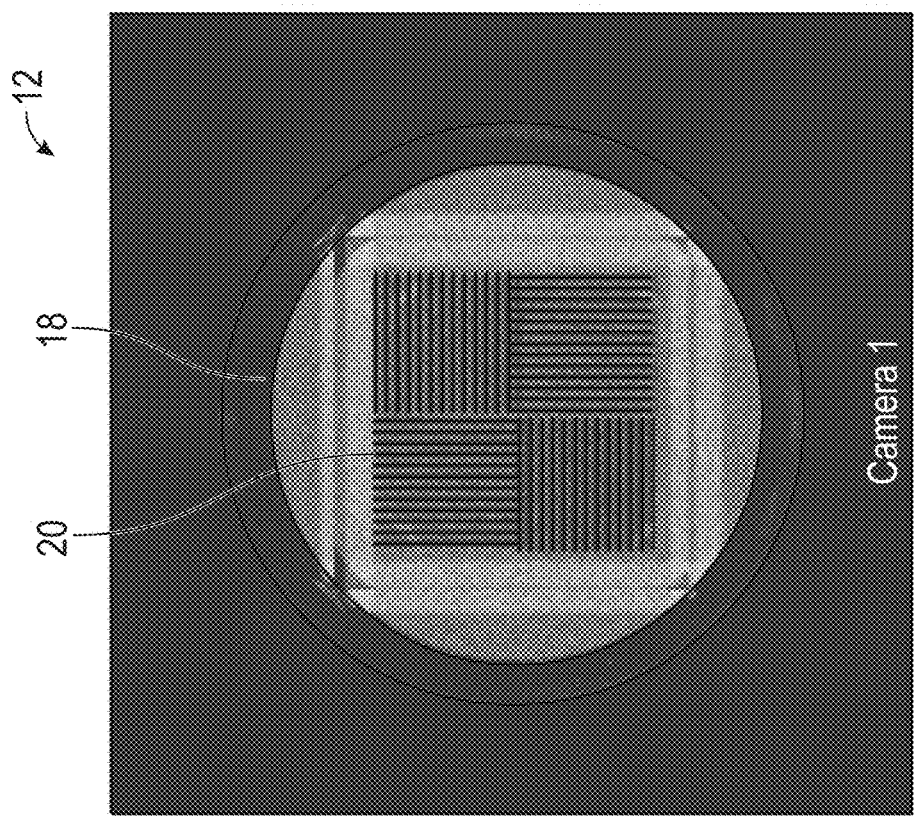

As shown in FIGS. 25A and 25B, the surface treatment provided on the culet 18 and pavilion 36 has a color that is perfect black, having perfectly absorbing surfaces that suppress specular reflections on the gemstone 12 and allow only glare reflections on the table 16 to be visible. As shown in FIGS. 26A and 26B, the gemstone 12 is uncoated, where specular glints are visible that interfere with the visibility of the indicia 20. In this embodiment, the visibility of the indicia 20 is limited to an area on the table 16 intersected by the orthographic projection of the area of the culet 18, where the indicia 20 has appropriate contrast in the orthographic projection of the culet 18 area such that the indicia 20 is scanable only in that area. As this area covers the entire indicia 20, the indicia 20 would be scanable in this embodiment.

Figure 27B:
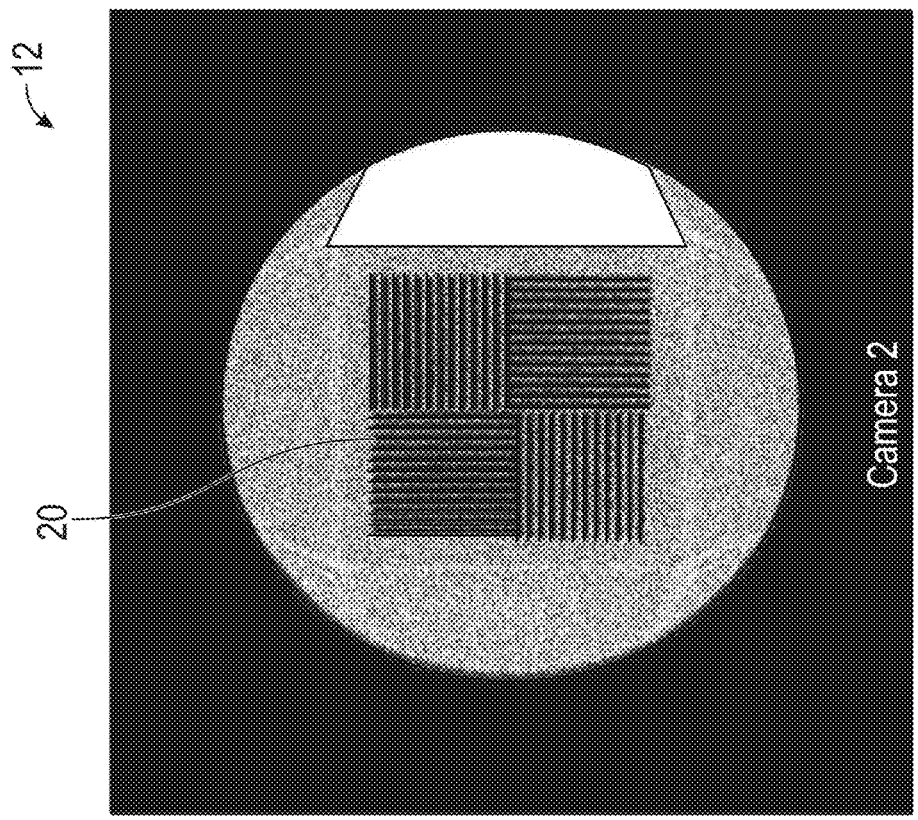
FIGS. 27A and 27B depict the gemstone of FIG. 22A under a light source simulating a lamp and having a surface treatment that is white, according to one or more embodiments shown and described herein.
Figure 27A:
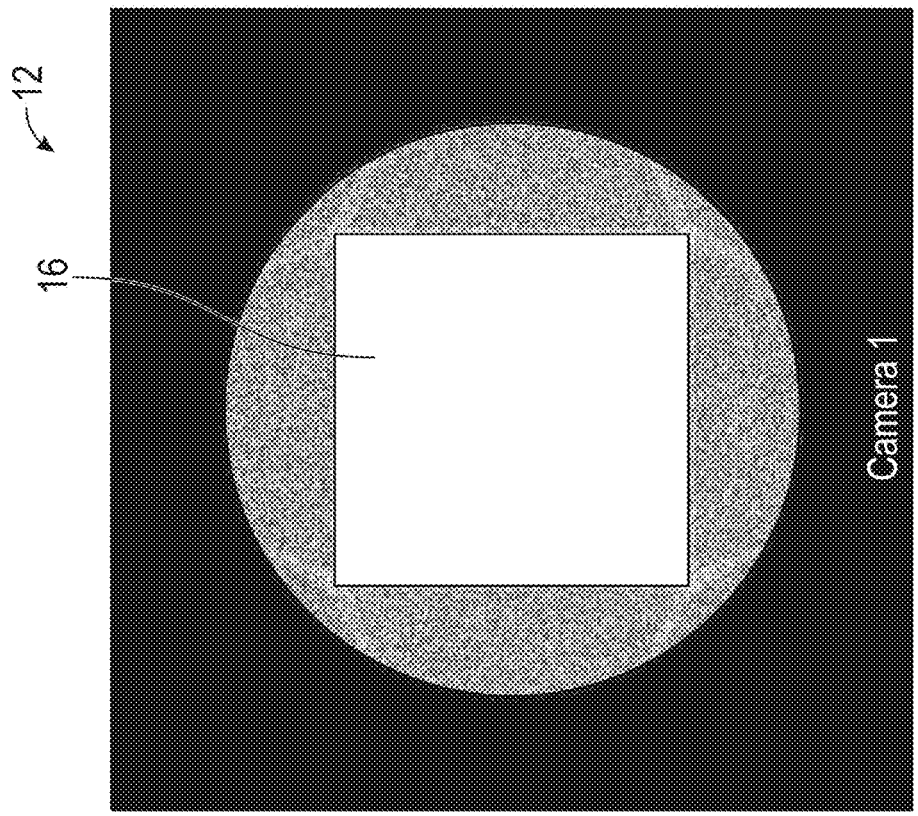
Figure 28B:
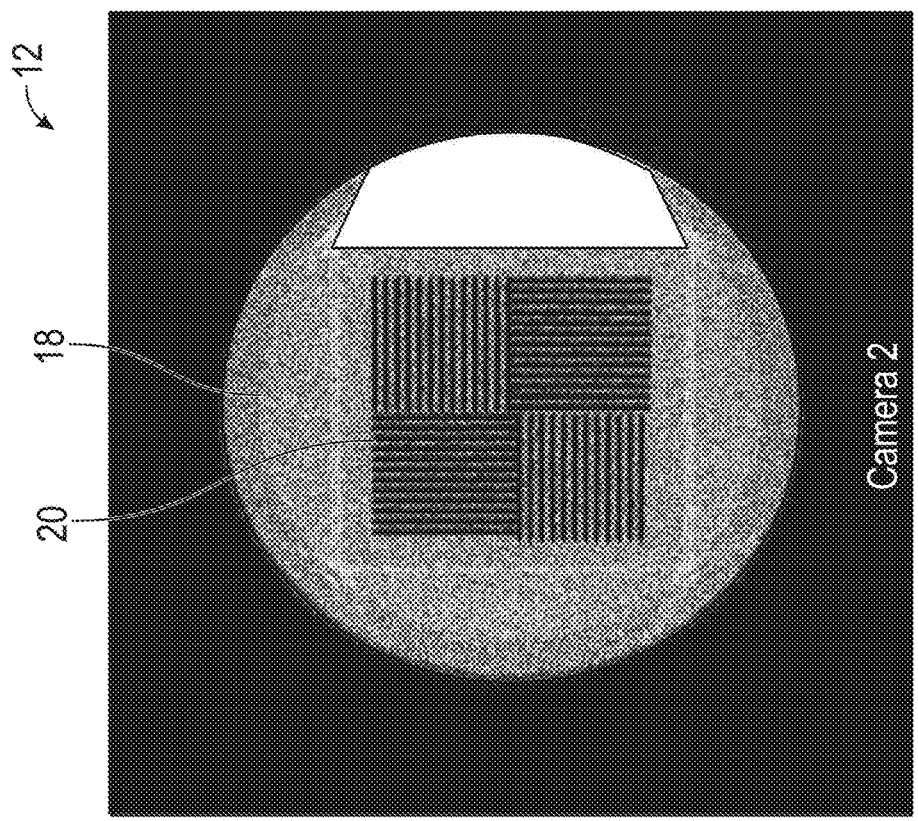
FIGS. 28A and 28B depict the gemstone of FIG. 22A under a light source simulating a lamp and having a surface treatment that is gray, according to one or more embodiments shown and described herein.
Figure 28A:
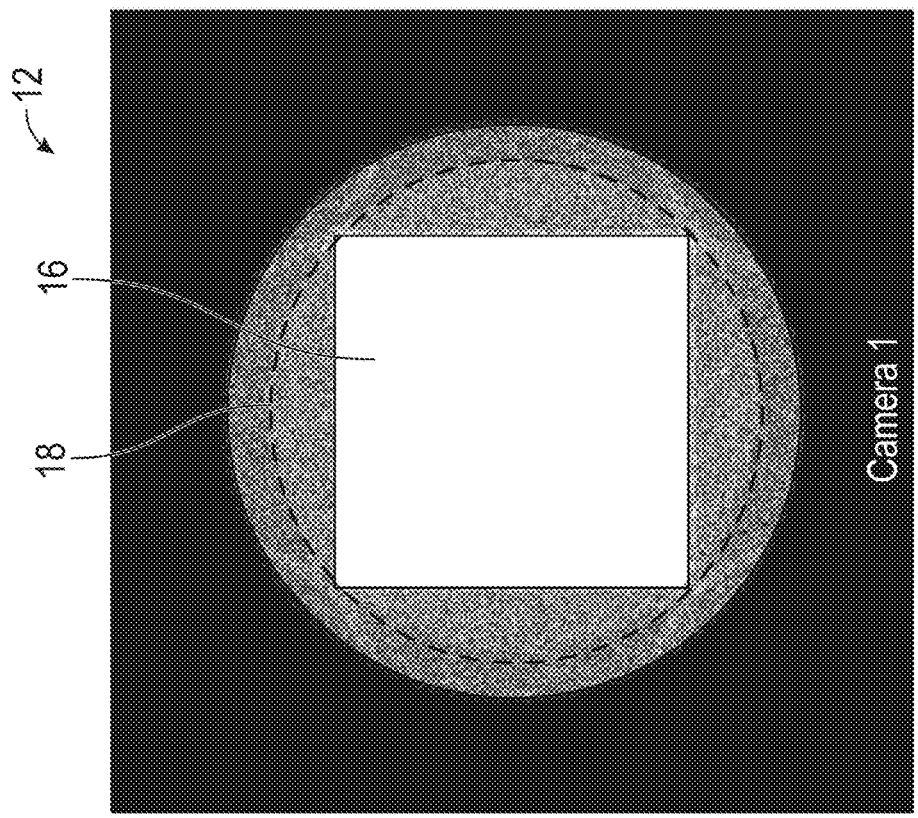
Figure 29B:
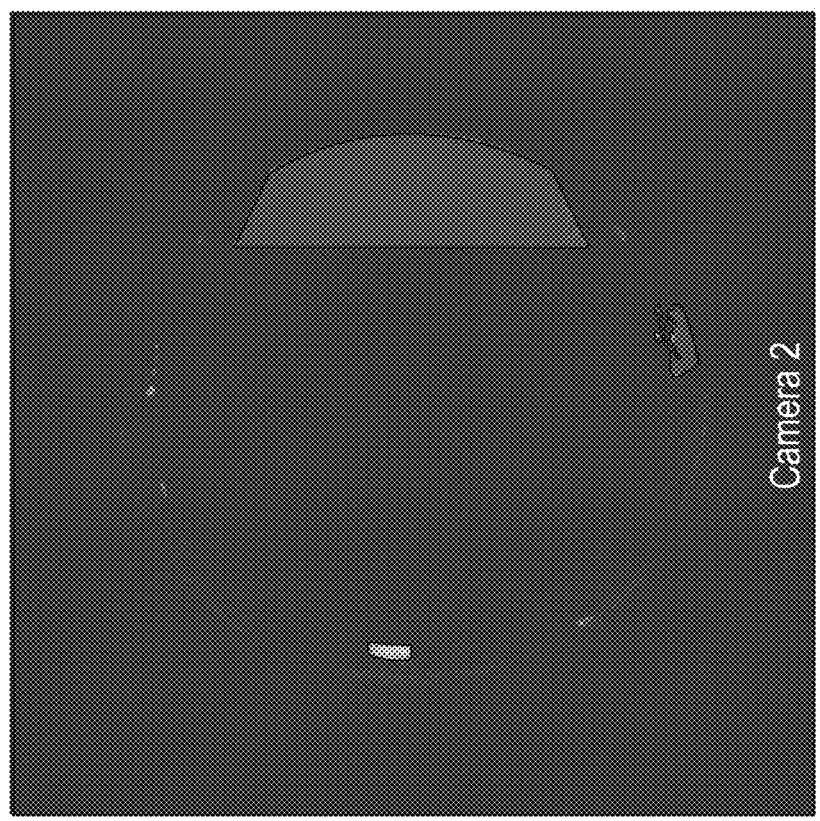
FIGS. 29A and 29B depict the gemstone of FIG. 22A under a light source simulating a lamp and having a surface treatment that is black, according to one or more embodiments shown and described herein.
Figure 29A:
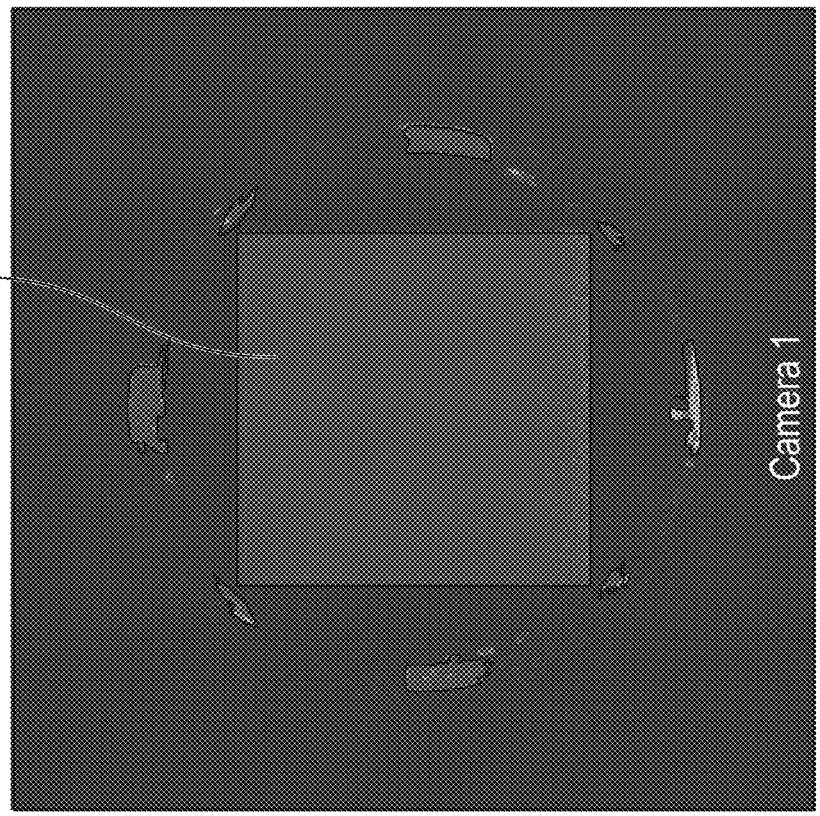
Figure 30B:
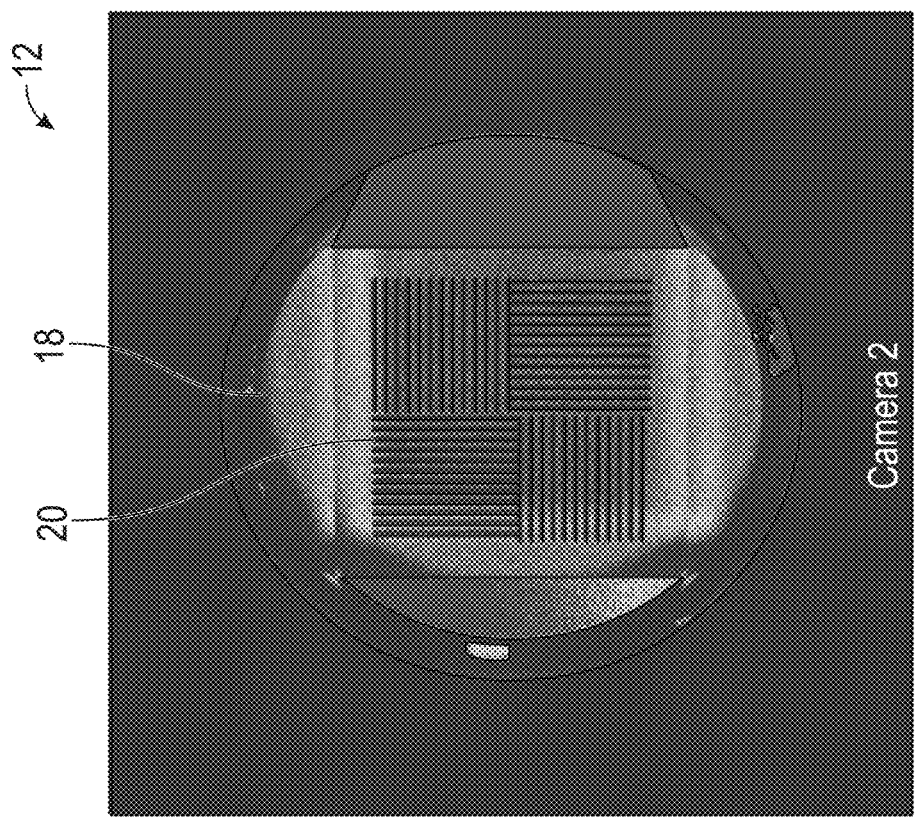
FIGS. 30A and 30B depict the gemstone of FIG. 22A under a light source simulating a lamp and being uncoated, according to one or more embodiments shown and described herein.
Figure 30A:
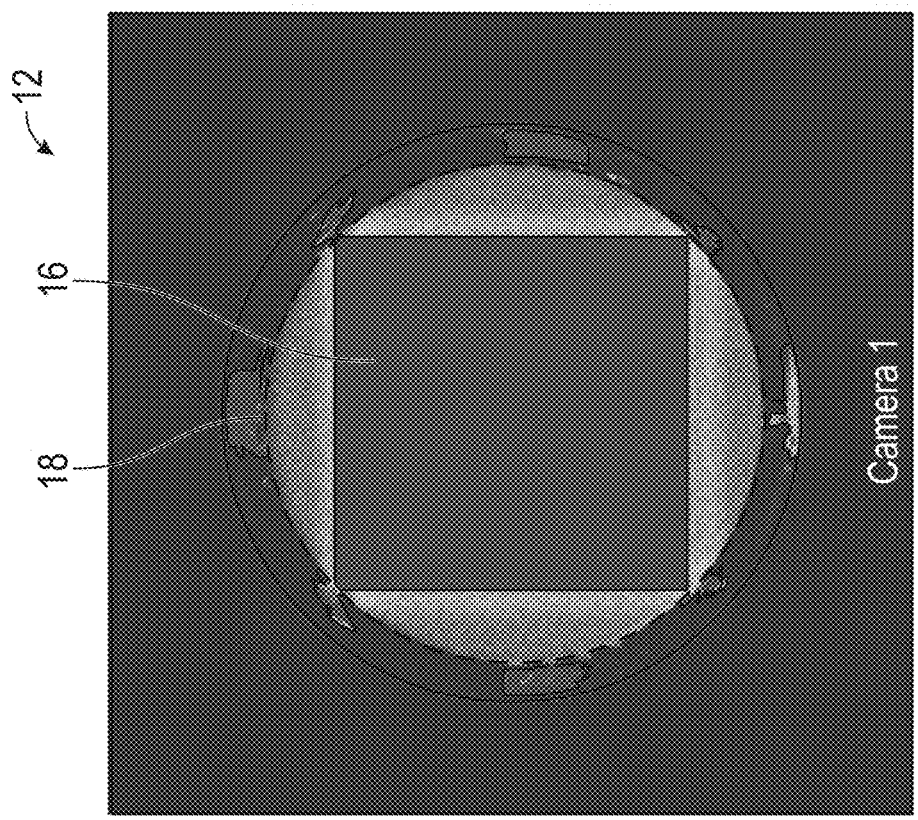
Figure 31B:
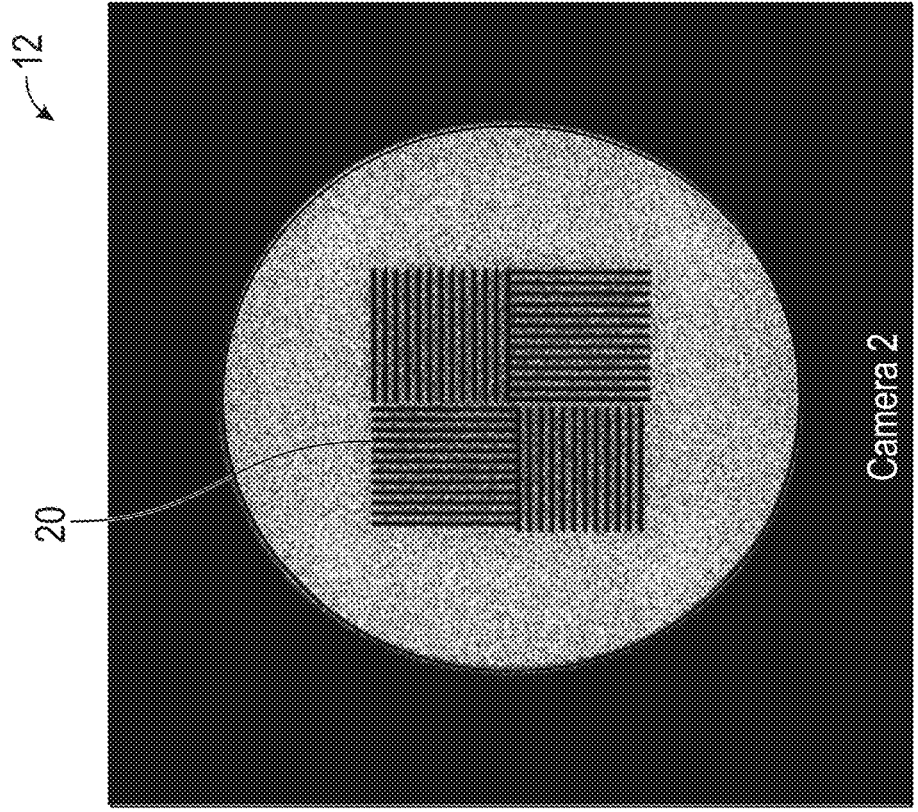
FIGS. 31A and 31B depict the gemstone of FIG. 22A under an ambient light source and having a surface treatment that is white, according to one or more embodiments shown and described herein.
Figure 31A:
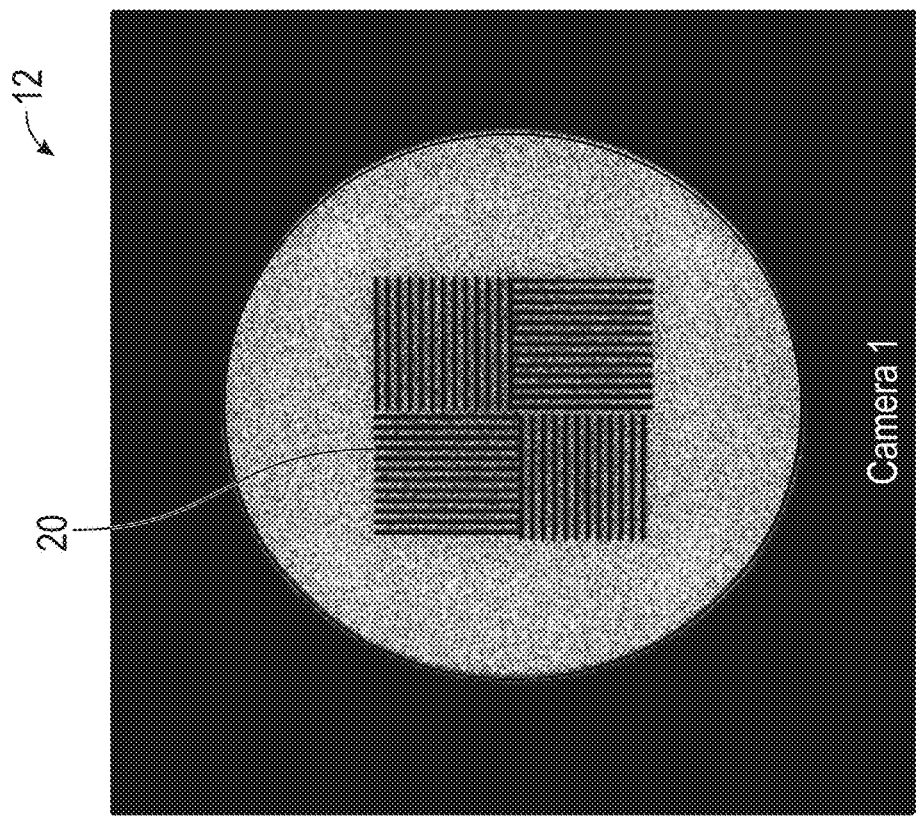

As shown in FIGS. 27A-30B, the light source used is the lamp source, where the increased angle of divergence of the light causes glare on the table 16, limiting the visibility of the indicia 20. These Figures are in a same order as the Figures above, where FIGS. 27A and 27B depict a perfect white surface treatment, FIGS. 28A and 28B depict a perfect gray surface treatment, FIGS. 29A and 29B depict a perfect black surface treatment, and FIGS. 30A and 30B depict an uncoated gemstone 12. Moreover, as shown in FIGS. 27A, 28A, 29A, and 30A, the glare from the light source entirely restricts visibility of the indicia 20 from the camera angled perpendicular to the table 16. Alternatively, as shown in FIGS. 27B, 28B, 29B, and 30B, the camera angled at 20° from the table 16 has a clear image of the indicia 20, where the indicia 20 would be scanable. FIGS. 31A and 31B depict an embodiment with an ambient light source, where the surface treatment is a perfect white. As shown, the ambient light source does not provide any glare on the table 16 or reduce the visibility of the indicia 20. Rather, the ambient light source reduces the visibility of other features on the gemstone 12, such as the facets of the crown.

The current disclosure is further defined in the following clauses:

Clause 1. A gemstone including: a table; a culet extending in parallel to the table and having an area at least 10% of a size of an area of the table; and a treatment covering at least the culet that reflects diffused light through the gemstone.

Clause 2. The gemstone according to the preceding clause, wherein the treatment is a paint that reflects diffused light through the gemstone.

Clause 3. The gemstone according to either of the preceding clauses, wherein the culet has an area that is equal to or greater than 80% of an area of the table.

Clause 4. The gemstone according to any of the preceding clauses, further including a means for conveying information, the means for conveying information formed in the gemstone at least partially positioned within an orthographic projection of the area of the culet extending along an axis, the axis extending perpendicularly through the table and the culet.

Clause 5. The gemstone according to clause 4, wherein the means for conveying information is formed within the gemstone between the table and the culet.

Clause 6. The gemstone according to either of clauses 4 and 5, wherein the means for conveying information is a QR code.

Clause 7. The gemstone according to clause 6, wherein the QR code includes a plurality of pixels, and a perimeter of the QR code is spaced apart from a perimeter of the table by a distance equal to or greater than four pixels of the plurality of pixels.

Clause 8. The gemstone according to any of clauses 4-7, further including an illuminated portion and a non-illuminated portion separate from the illuminated portion, the illuminated portion has a greater brightness than a brightness of the non-illuminated portion, and the non-illuminated portion is an area of the table that intersects the orthographic projection of the area of the culet along the axis.

Clause 9. The gemstone according to any of the preceding clauses, further including a crown including a plurality of facets, the facets abutting a perimeter of the table to define a shape of the table, and the shape of the table is selected from one of a pentagon, square or rectangle.

Clause 10. The gemstone according to any of the preceding clauses, wherein the culet is bruted.

Clause 11. A gemstone including: a table; a culet extending parallel to the table, the culet defining an area; and a scanable indicia formed in the gemstone at least partially positioned within an orthographic projection of the area extending along an axis, the axis extending perpendicularly through the table and the culet.

Clause 12. The gemstone according to the preceding clause, wherein the scanable indicia is visible between 1× and 9× magnification.

Clause 13. A scanning device for scanning a scanable indicia in a gemstone, the scanning device including: a scanner configured to read the scanable indicia; a light source configured to illuminate the scanable indicia; and a controller communicatively coupled to the scanner to be configured to determine whether the scanable indicia is between a table and a culet of the gemstone.

Clause 14. The scanning device according to the preceding clause, further including a diamond sensor configured to determine whether the gemstone is a diamond.

Clause 15. The scanning device according to the preceding clause, wherein the light source is configured to illuminate the table of the gemstone, the scanner sends signals to the controller indicative of a reflectivity of the table of the gemstone, and the controller determines whether the scanable indicia is below the table based on the reflectivity of the table, wherein the light source emits light at an angle oblique to the table of the gemstone that reflects off of the table of the gemstone, and the scanner determines the reflectivity of the table of the gemstone from the light reflecting off of the table.

Clause 16. The scanning device according to either of clauses 14 and 15, wherein the diamond sensor is a heated probe configured to detect a heat loss rate of the table of the gemstone, the diamond sensor is communicatively coupled to the controller to send a signal to the controller indicative of the heat loss rate of the table, and the controller determines whether the gemstone is a diamond based on the heat loss rate of the table.

Clause 17. The scanning device according to any of clauses 14-16, further including an indicator communicatively coupled to the controller configured to indicate whether the gemstone is both a diamond and the indicia is between the table and the culet of the gemstone.

Clause 18. The scanning device according to any of the preceding clauses, further including an elongated body defining a cavity and an opening at an end, the cavity is concave, and the scanner is coupled to the body and positioned within the cavity.

Clause 19. The scanning device according to the preceding clause, wherein the scanner is positioned at an apex of the cavity, and the light source is positioned within the cavity and directs light toward the opening in the body.

Clause 20. The scanning device according to any of clauses 18-19, further including a sealing member coupled to the end of the body.

Clause 21. The scanning device according to any of the preceding clauses, wherein the controller determines whether the scanable indicia is below the table of the gemstone based on reflections of light from the light source on the table.

Clause 22. The scanning device according to the preceding clause, wherein the controller determines that the scanable indicia is below the table of the gemstone when the scanner detects that a surface roughness of the table is below a predetermined threshold value.

Clause 23. A scanning device for scanning a scanable indicia in a gemstone, the scanning device including: an elongated body defining a cavity and an opening at an end; a scanner configured to read the scanable indicia, the scanner is coupled to the body and positioned within the cavity; and a controller communicatively coupled to the scanner to be configured to determine whether the scanable indicia is below a table of the gemstone.

Clause 24. A method of cutting a gemstone, the method including: cutting a table and a culet extending in parallel to the table, the culet having an area at least 10% of a size of an area of the table; treating the culet with a treatment that reflects diffused light through the gemstone; and forming a scanable indicia within the gemstone.

Clause 25. The method according to the preceding clause, wherein treating the culet comprises painting the culet.

Clause 26. The method according to either of clauses 24 and 25, wherein treating the culet comprises bruting the culet by grinding the at least one of the culet and the pavilion with a diamond grit sandpaper.

Clause 27. The method according to any of the preceding clauses, further including polishing the table.

Clause 28. The method according to any of the preceding clauses, further including cutting a plurality of facets in a crown, the facets abutting a perimeter of the table to define a shape of the table, and the shape of the table is selected from one of an pentagon, square, and rectangle.

Clause 29. The method according to any of the preceding clauses, further including forming a scanable indicia at least partially positioned within an orthographic projection of the area of the culet extending along an axis, the axis extending perpendicularly through the table and the culet.

Clause 30. The method according to the preceding clause, wherein forming the scannable indicia comprises laser treating the gemstone to form the scannable indicia within the gemstone between the table and the culet.

Clause 31. The method according to any of the preceding clauses, wherein the scanable indicia is formed in the gemstone at least partially positioned within an orthographic projection of the area of the culet extending along an axis, the axis extending perpendicularly through the table and the culet.

Clause 32. A method of authentication, the method including: cutting a gemstone to form a table and a culet extending parallel to the table, the culet defines an area; and forming a scanable indicia at least partially positioned within an orthographic projection of the area extending along an axis, the axis extending perpendicularly through the table and the culet.

Clause 33. The method according to the preceding clause, further including scanning the scanable indicia with a scanning device by aligning a scanner of the scanning device along the axis of the gemstone to scan the indicia.

Clause 34. The method according to either of the preceding clauses, further including receiving information related to the scanable indicia, and displaying the information related to the scanable indicia.

Clause 35. A transparent material including: a table; a culet extending in parallel to the table and having an area at least 10% of a size of an area of the table; a treatment covering at least the culet; and a scanable indicia positioned between the table and the culet.

Clause 36. The transparent material of clause 35, wherein the scanable indicia is a QR code.

Clause 37. The transparent material of either of clauses 35 or 36, further including an illuminated portion and a non-illuminated portion separate from the illuminated portion, the illuminated portion has a greater brightness than a brightness of the non-illuminated portion, and the non-illuminated portion is an area of the table that intersects the orthographic projection of the area of the culet along the axis.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gemstone comprising:
   a table;
   a culet extending in parallel to the table and having an area at least 10% of a size of an area of the table;
   a means for conveying information when scanned by a scanning device, the means for conveying information comprising an indicia formed in the gemstone; and
   a treatment covering at least the culet that reflects diffused light through the gemstone to increase visibility of the indicia.

2. The gemstone of claim 1, wherein the treatment is a paint that reflects diffused light through the gemstone.

3. The gemstone of claim 1, wherein the culet has an area that is equal to or greater than 80% of an area of the table.

4. The gemstone of claim 1, wherein the means for conveying information is formed in the gemstone at least partially positioned within an orthographic projection of the area of the culet extending along an axis, the axis extending perpendicularly through the table and the culet.

5. The gemstone of claim 1, wherein the means for conveying information is formed within the gemstone between the table and the culet.

6. The gemstone of claim 1, wherein the means for conveying information is a QR code.

7. The gemstone of claim 6, wherein the QR code comprises a plurality of pixels, and a perimeter of the QR code is spaced apart from a perimeter of the table by a distance equal to or greater than four pixels of the plurality of pixels.

8. The gemstone of claim 4, further comprising an illuminated portion and a non-illuminated portion separate from the illuminated portion, the illuminated portion has a greater brightness than a brightness of the non-illuminated portion, and the non-illuminated portion is an area of the table that intersects the orthographic projection of the area of the culet along the axis.

9. The gemstone of claim 1, further comprising a crown comprising a plurality of facets, the facets abutting a perimeter of the table to define a shape of the table, and the shape of the table is selected from one of a pentagon, square or rectangle.

10. The gemstone of claim 1, wherein the culet is bruted.

* * * * *